Figure 4:
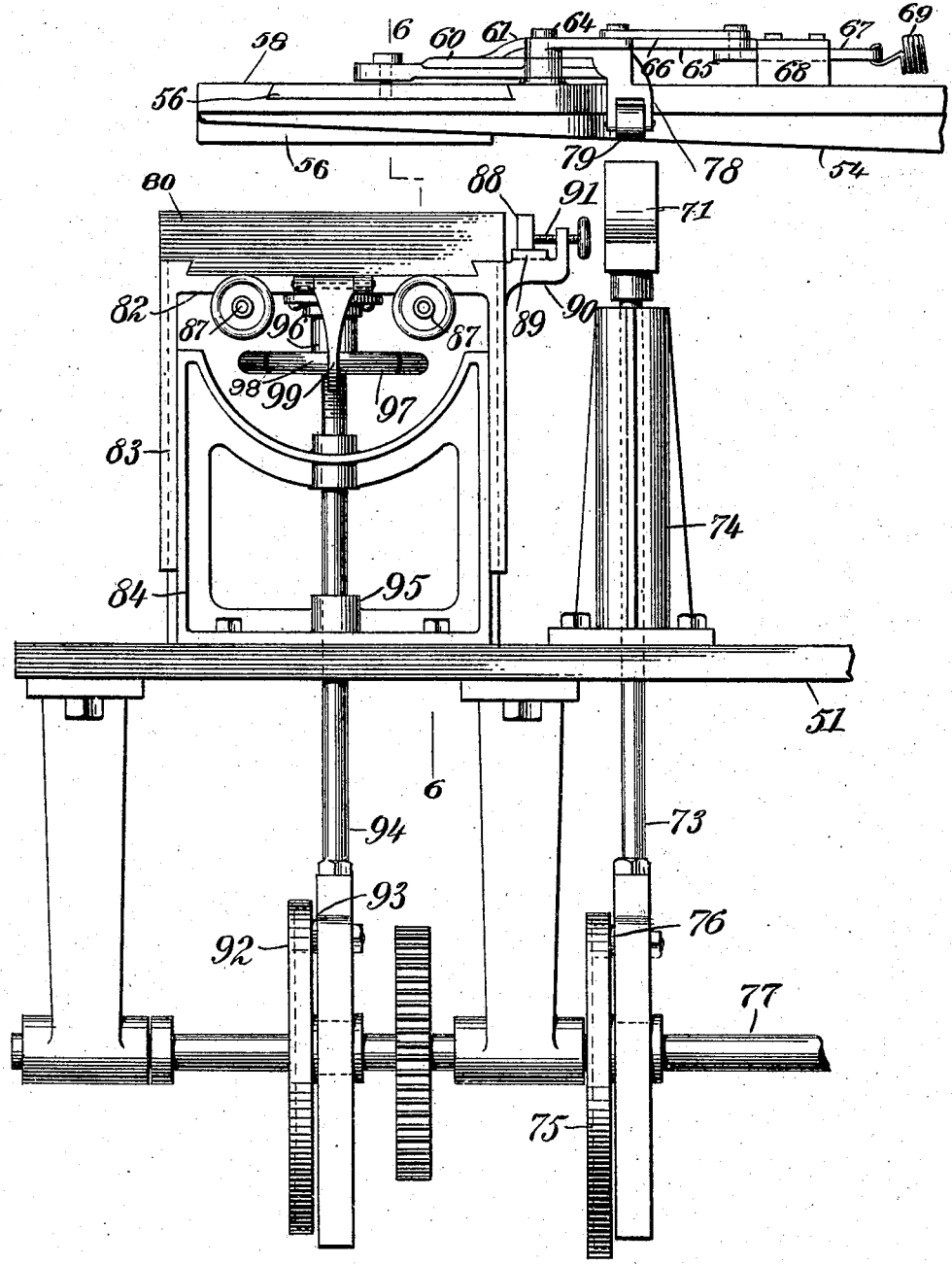

No. 847,891. PATENTED MAR. 19, 1907.
W. E. BLAUVELT.
BOOKBINDING MACHINE.
APPLICATION FILED JULY 12, 1904.
21 SHEETS—SHEET 1.
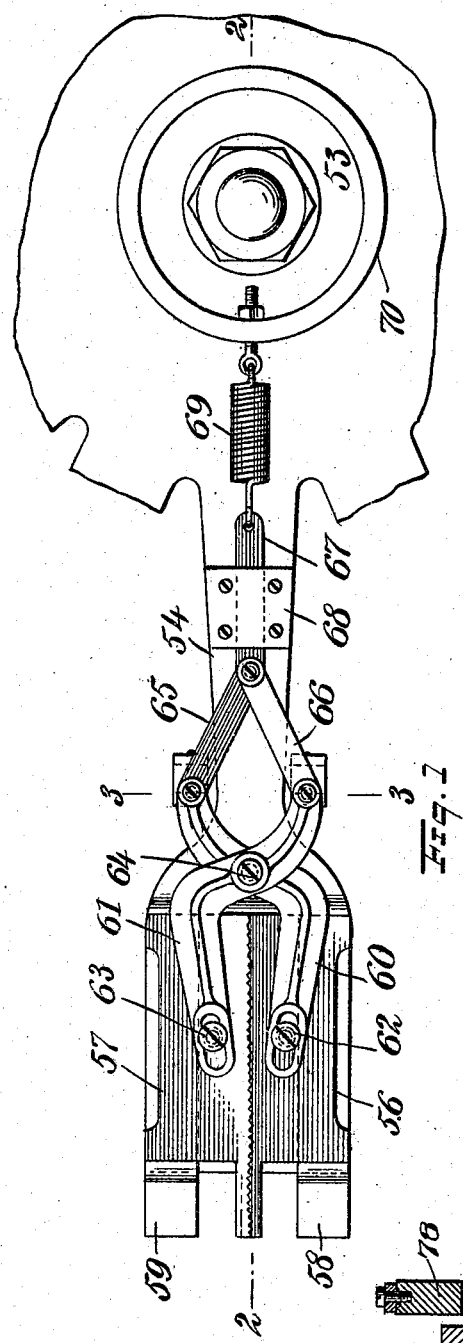
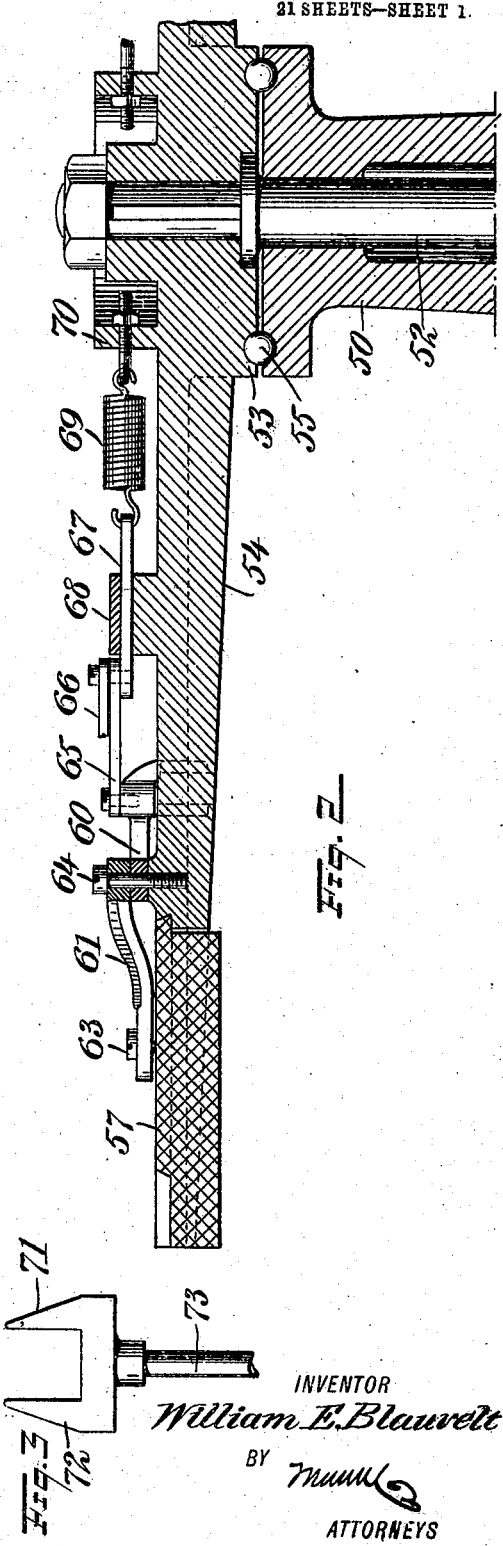
WITNESSES:
INVENTOR
William E. Blauvelt
BY
ATTORNEYS No. 847,891. PATENTED MAR. 19, 1907.
W. E. BLAUVELT.
BOOKBINDING MACHINE.
APPLICATION FILED JULY 12, 1904.

21 SHEETS—SHEET 2.

WITNESSES:

INVENTOR
William E. Blauvelt
BY
ATTORNEYS

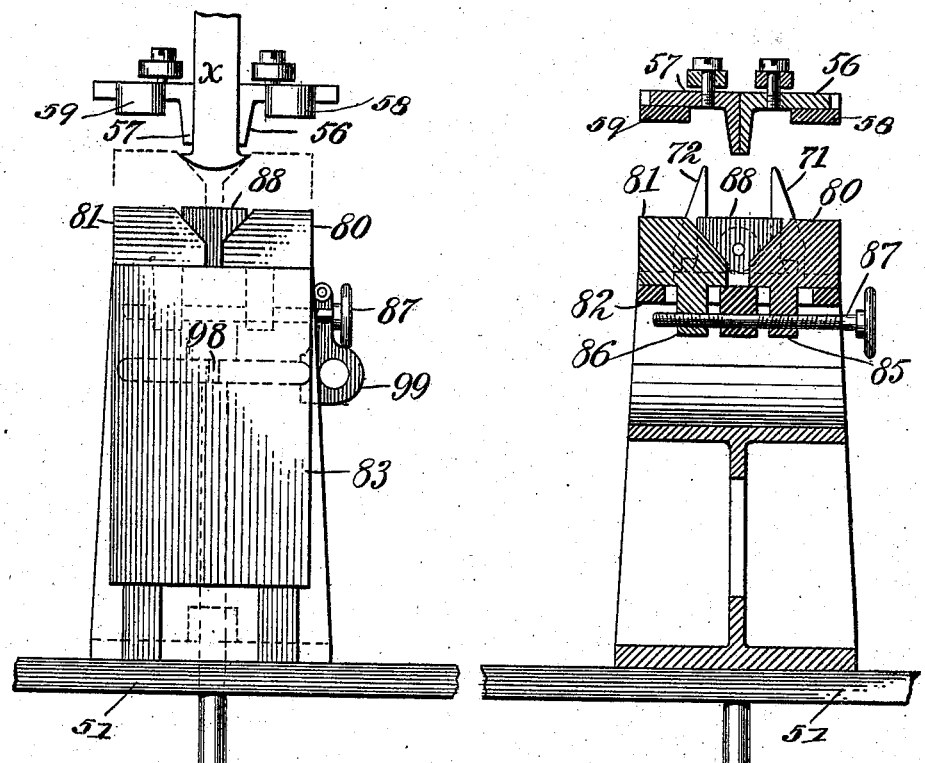

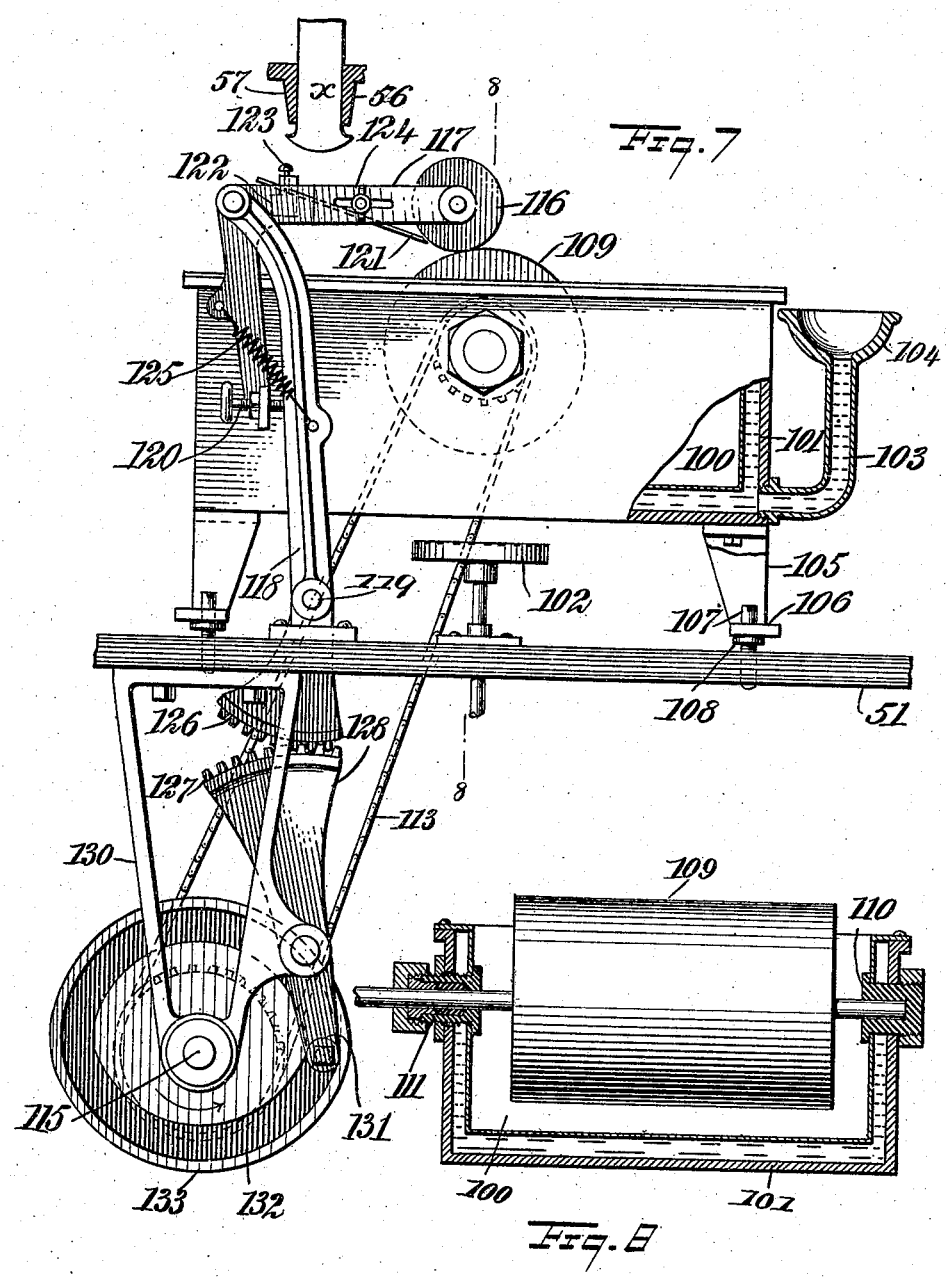

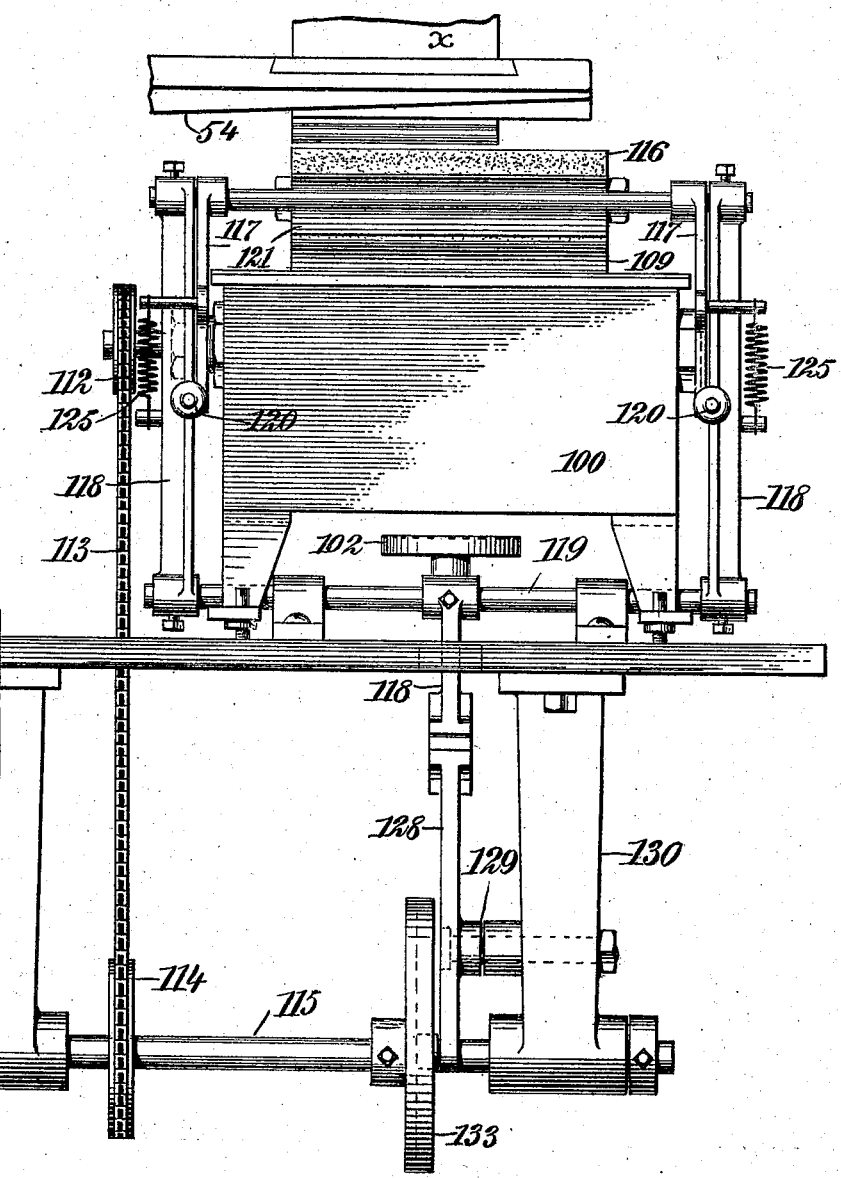

No. 847,891. PATENTED MAR. 19, 1907.
W. E. BLAUVELT.
BOOKBINDING MACHINE.
APPLICATION FILED JULY 12, 1904.
21 SHEETS—SHEET 6.
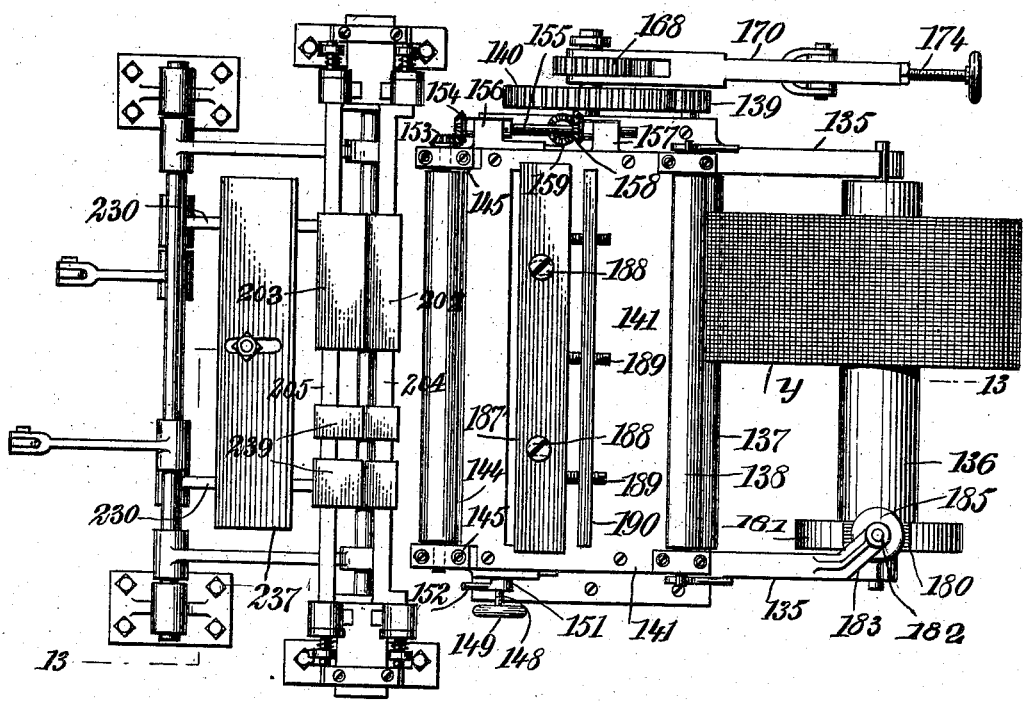
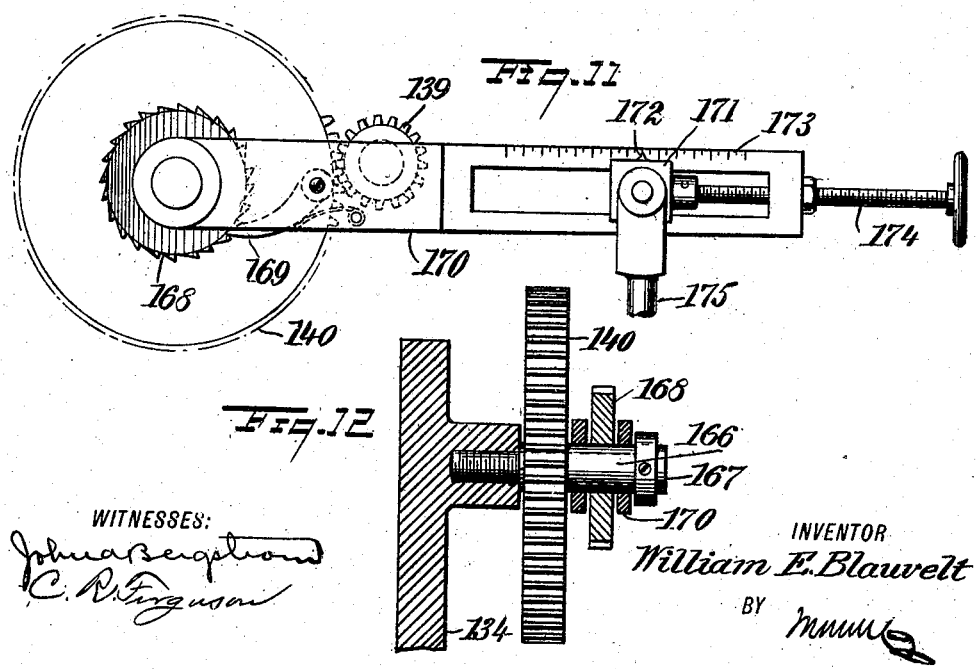
WITNESSES:
INVENTOR
William E. Blauvelt
BY
ATTORNEYS

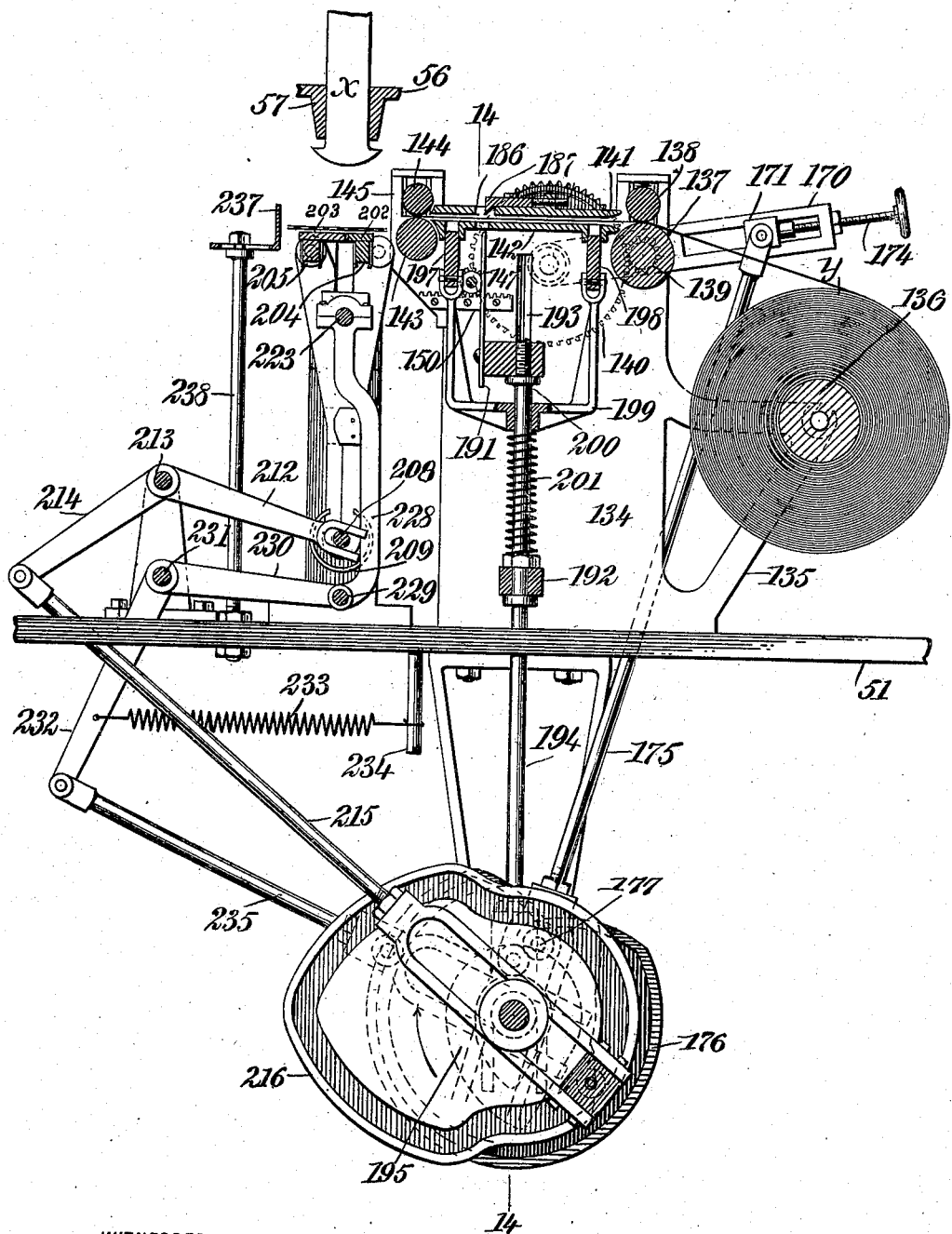

No. 847,891. PATENTED MAR. 19, 1907.
W. E. BLAUVELT.
BOOKBINDING MACHINE.
APPLICATION FILED JULY 12, 1904.

21 SHEETS—SHEET 8.

WITNESSES:

INVENTOR
William E. Blauvelt
BY
ATTORNEYS

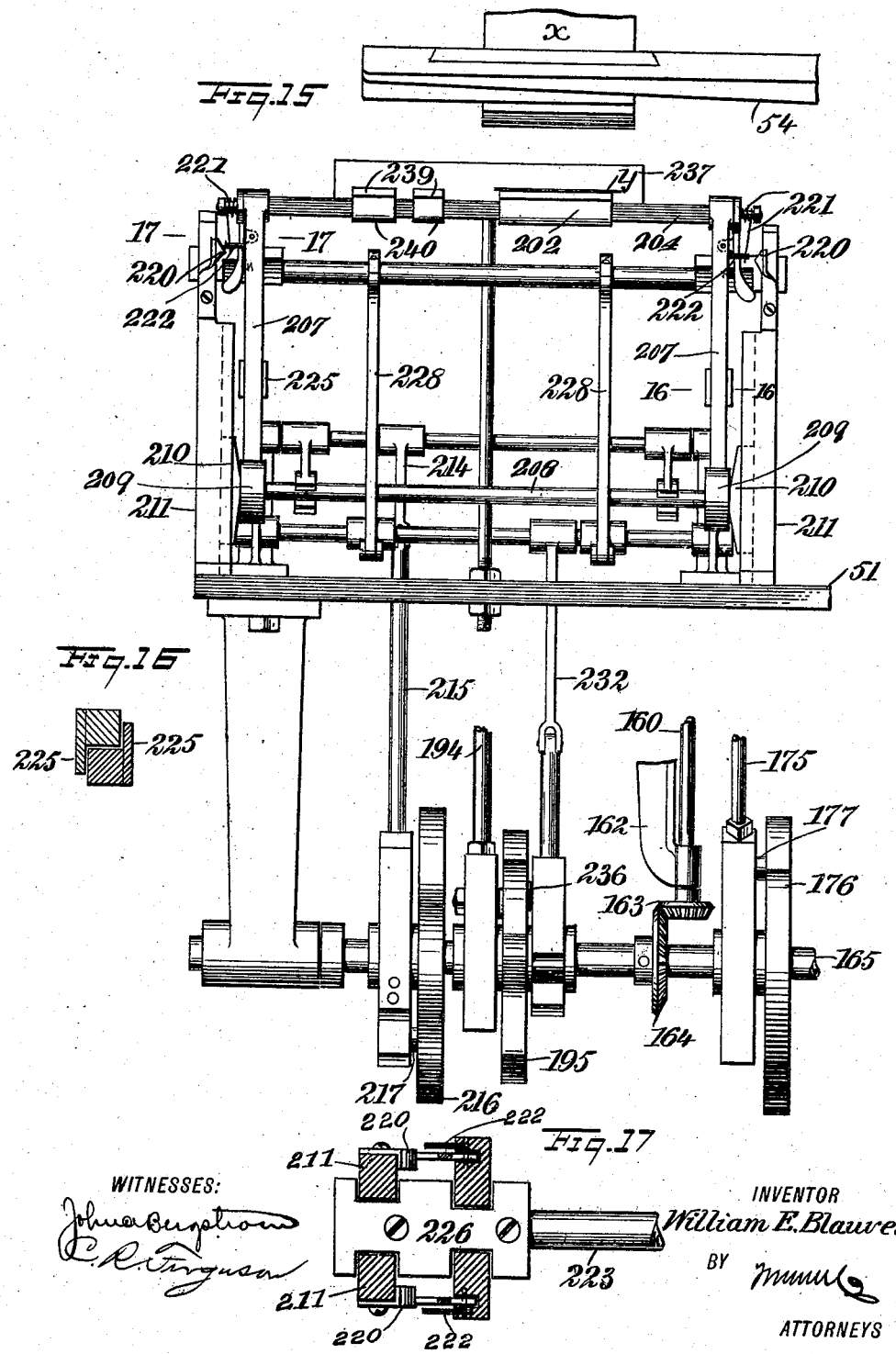

No. 847,891. PATENTED MAR. 19, 1907.
W. E. BLAUVELT.
BOOKBINDING MACHINE.
APPLICATION FILED JULY 12, 1904.
21 SHEETS—SHEET 10.
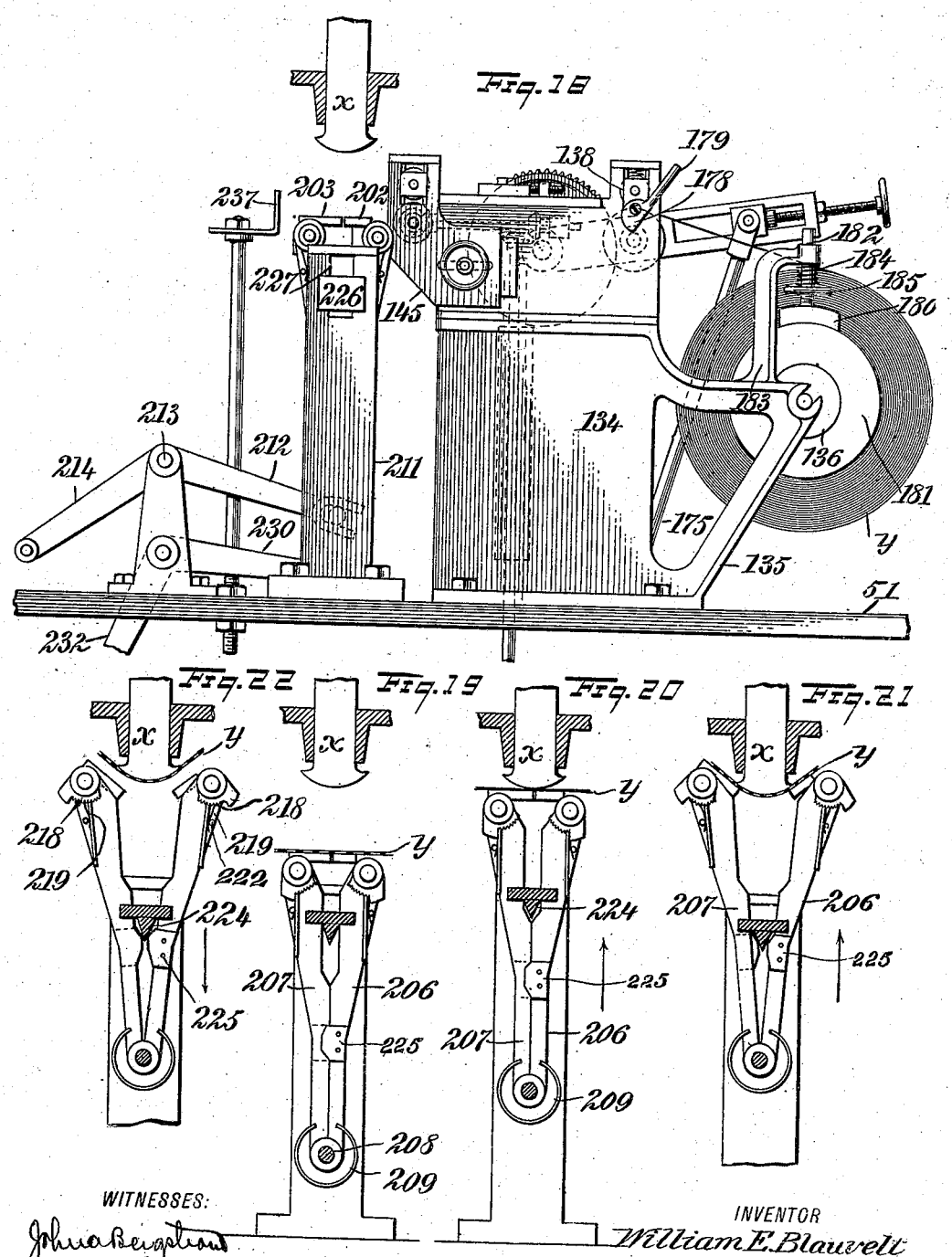
WITNESSES:
INVENTOR
William E. Blauvelt
BY
ATTORNEYS

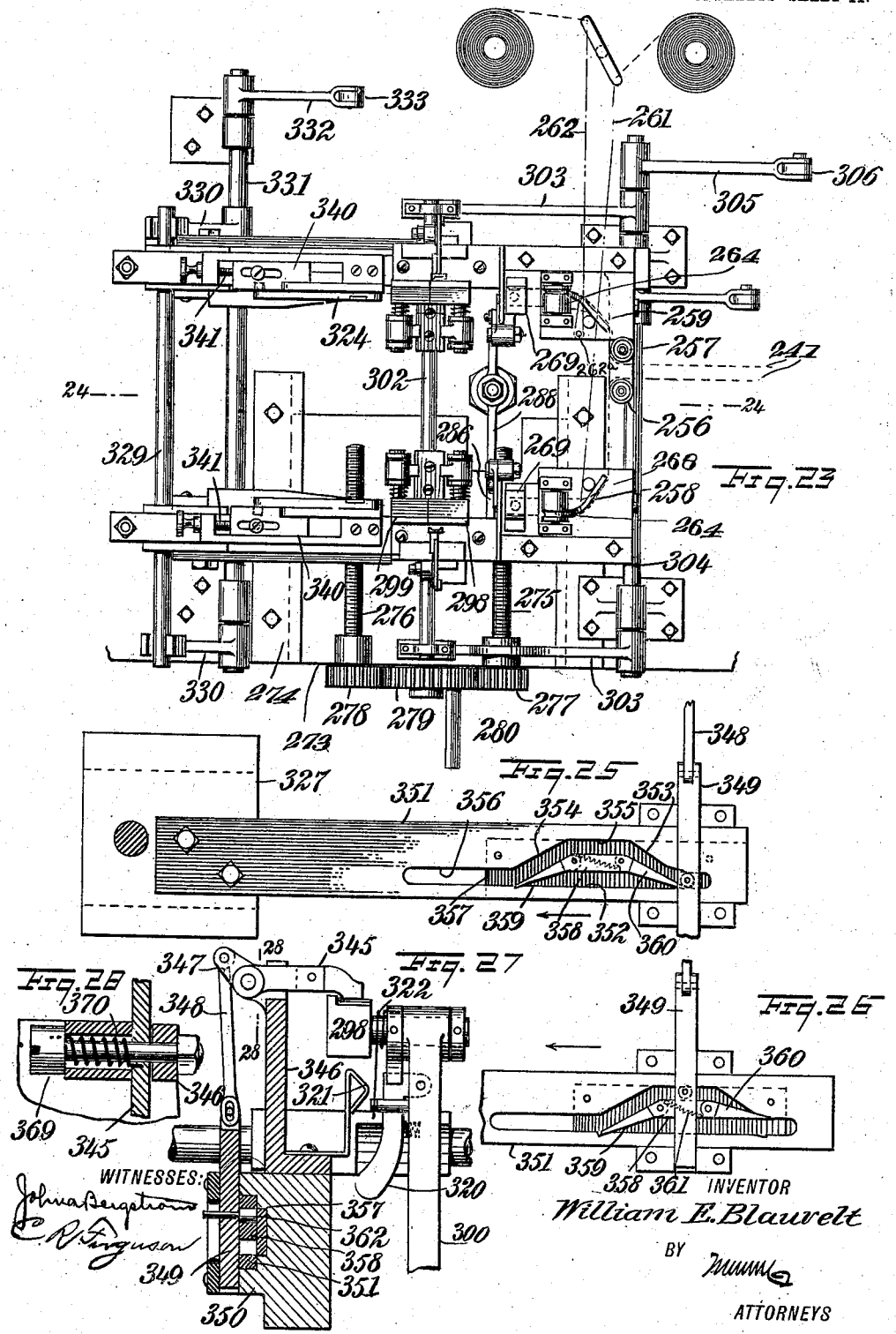

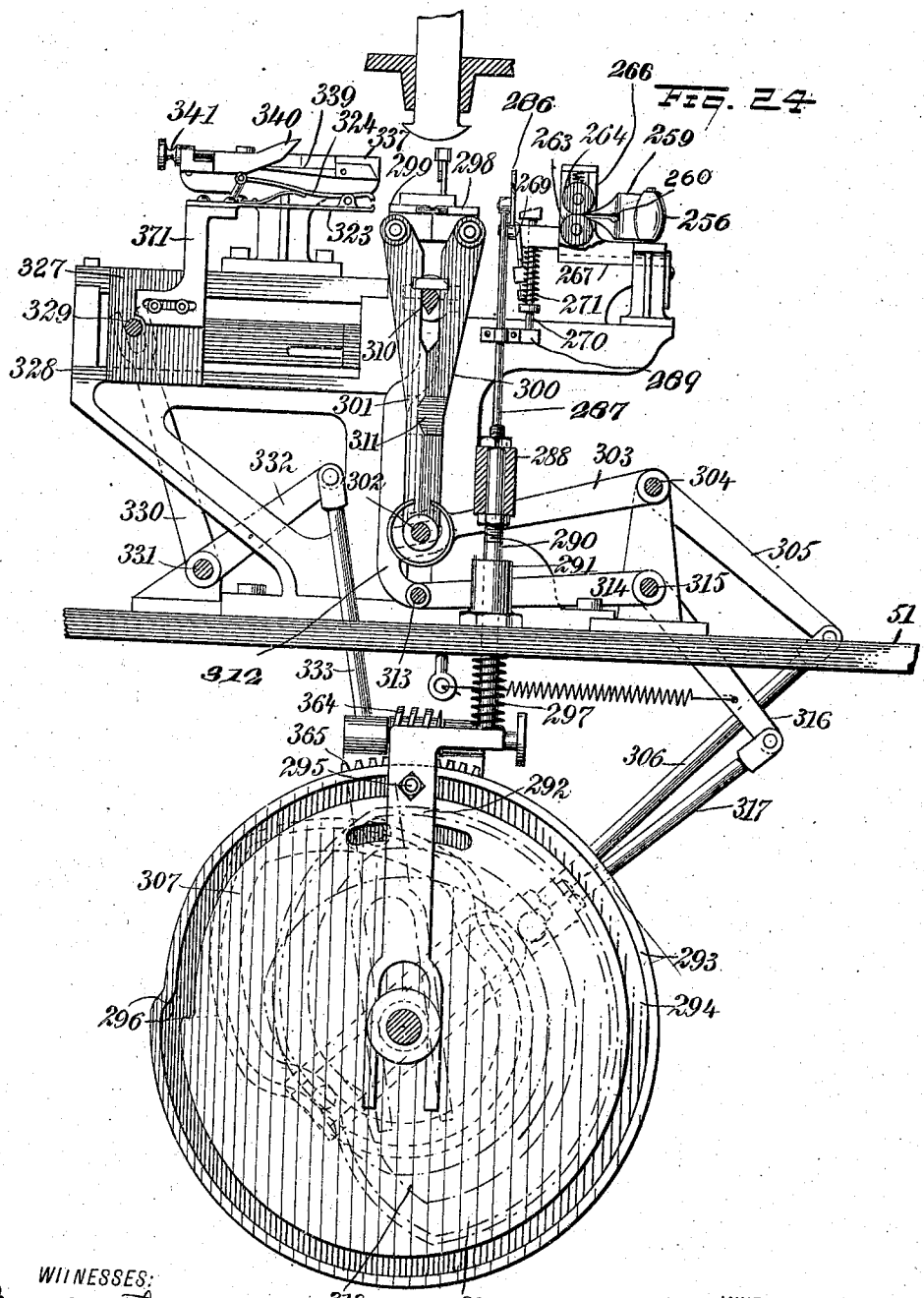

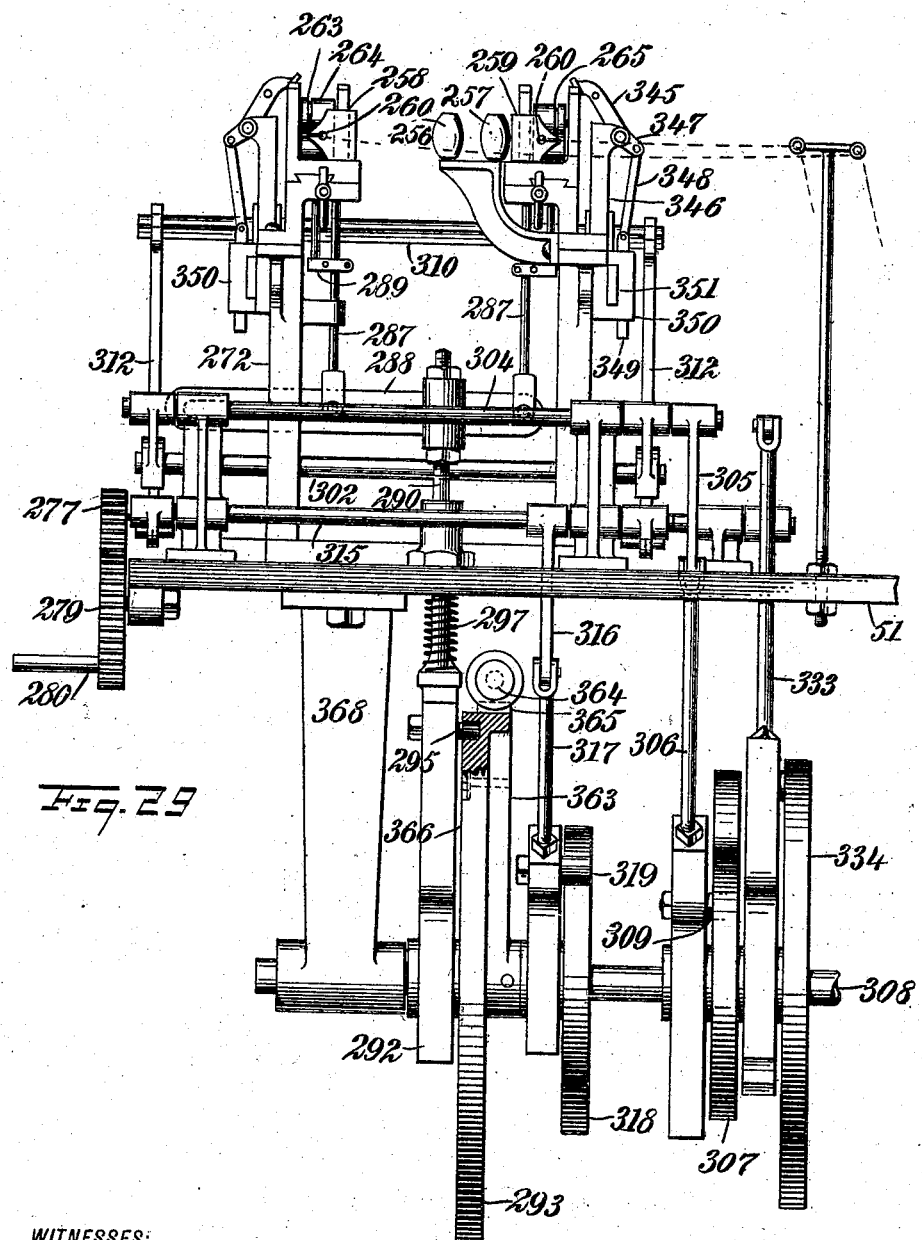

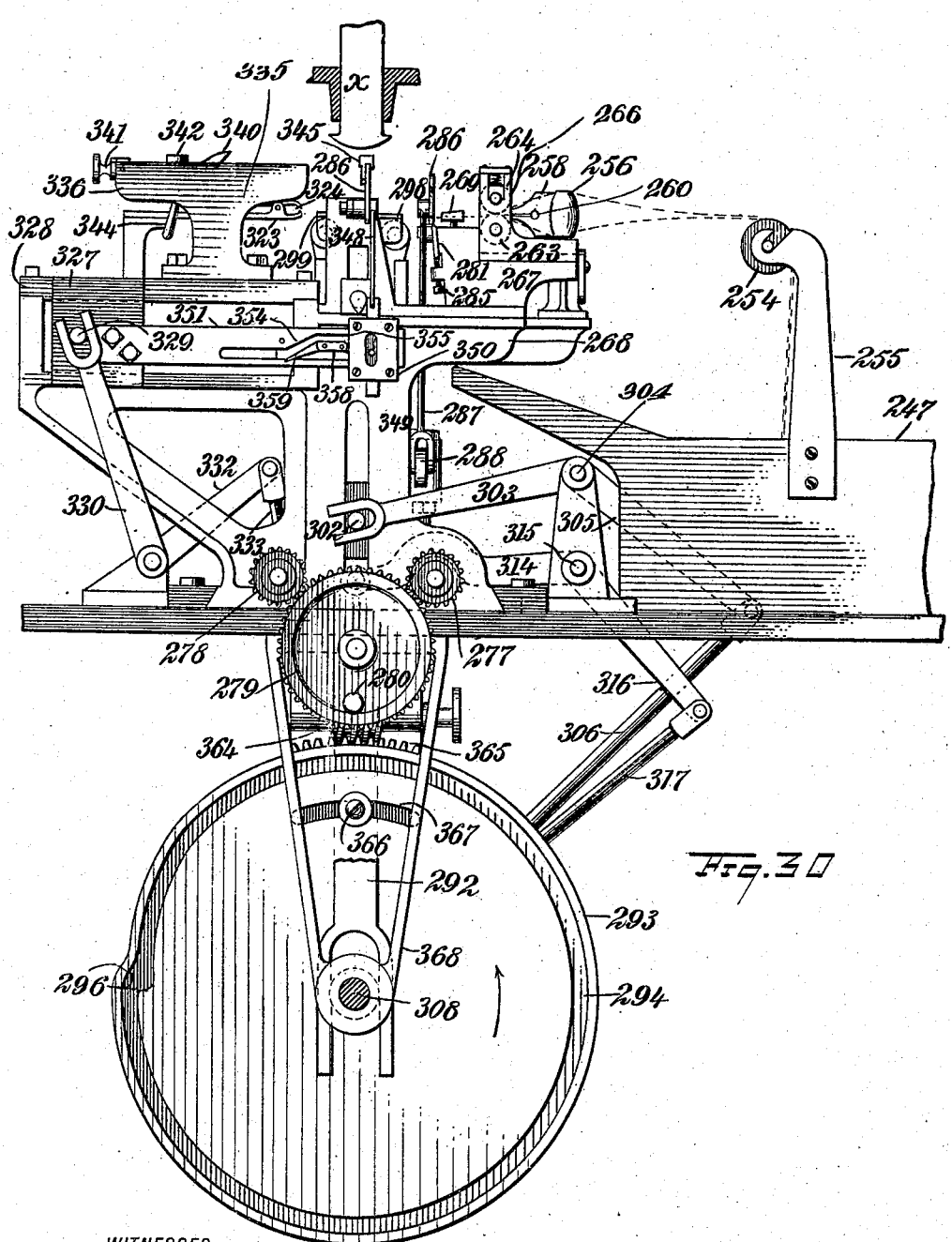

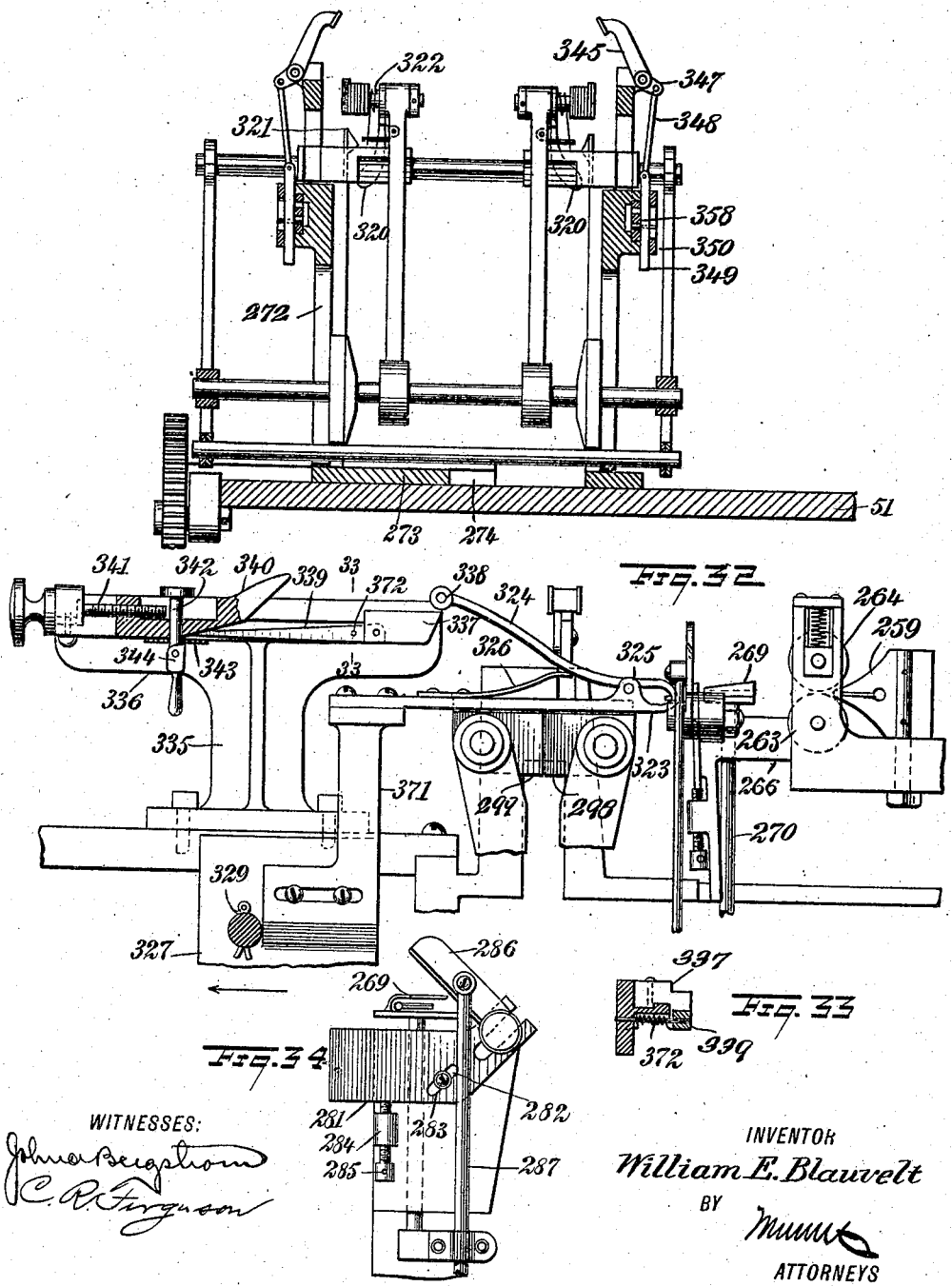

No. 847,891. PATENTED MAR. 19, 1907.
W. E. BLAUVELT.
BOOKBINDING MACHINE.
APPLICATION FILED JULY 12, 1904.
21 SHEETS—SHEET 16.
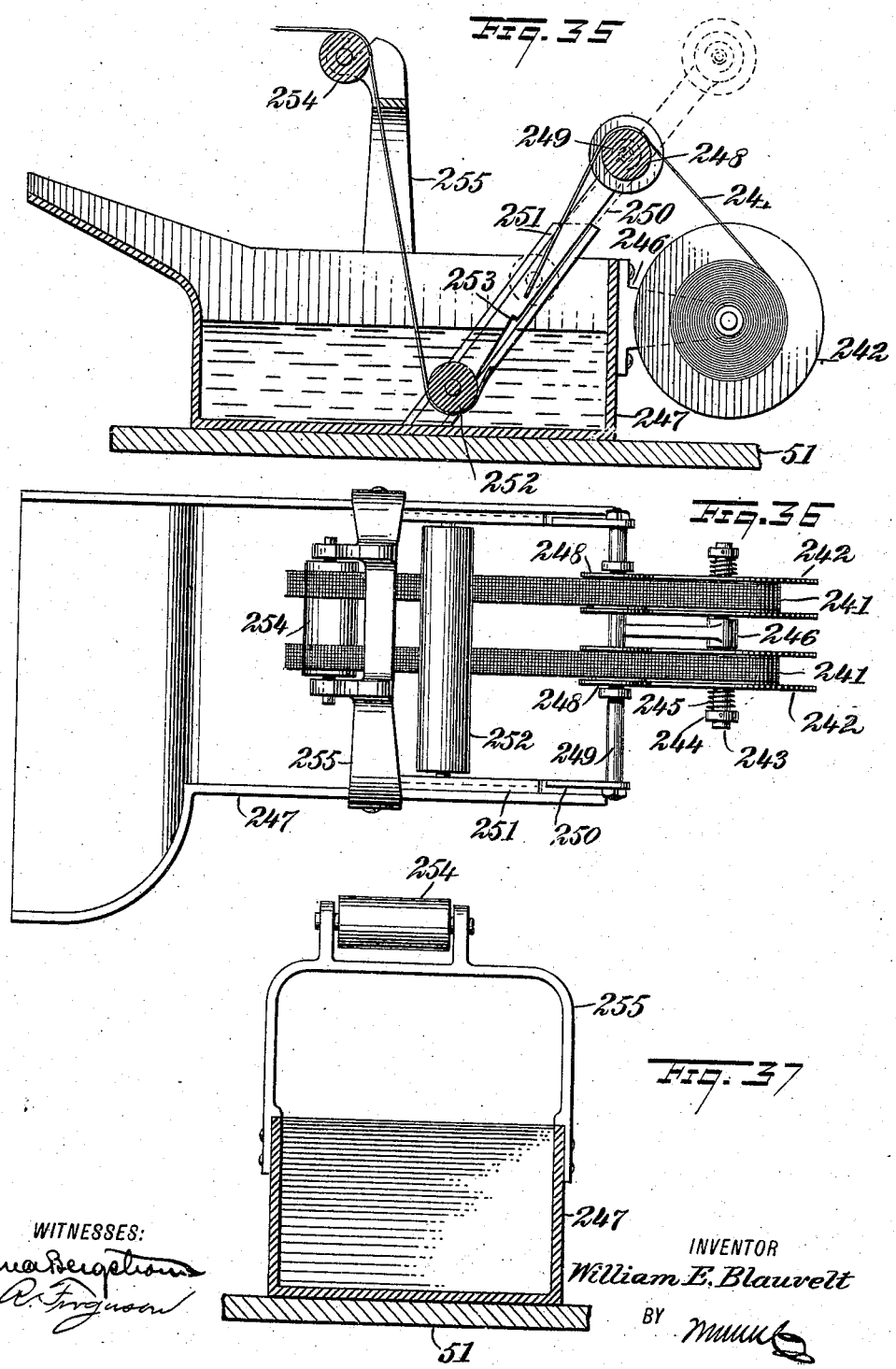
WITNESSES:
INVENTOR
William E. Blauvelt
BY
ATTORNEYS No. 847,891. PATENTED MAR. 19, 1907.
W. E. BLAUVELT.
BOOKBINDING MACHINE.
APPLICATION FILED JULY 12, 1904.

21 SHEETS—SHEET 17.

WITNESSES:

INVENTOR
William E. Blauvelt
BY
ATTORNEYS

No. 847,891. PATENTED MAR. 19, 1907.
W. E. BLAUVELT.
BOOKBINDING MACHINE.
APPLICATION FILED JULY 12, 1904.

21 SHEETS—SHEET 18.

WITNESSES:

INVENTOR
William E. Blauvelt
BY
ATTORNEYS

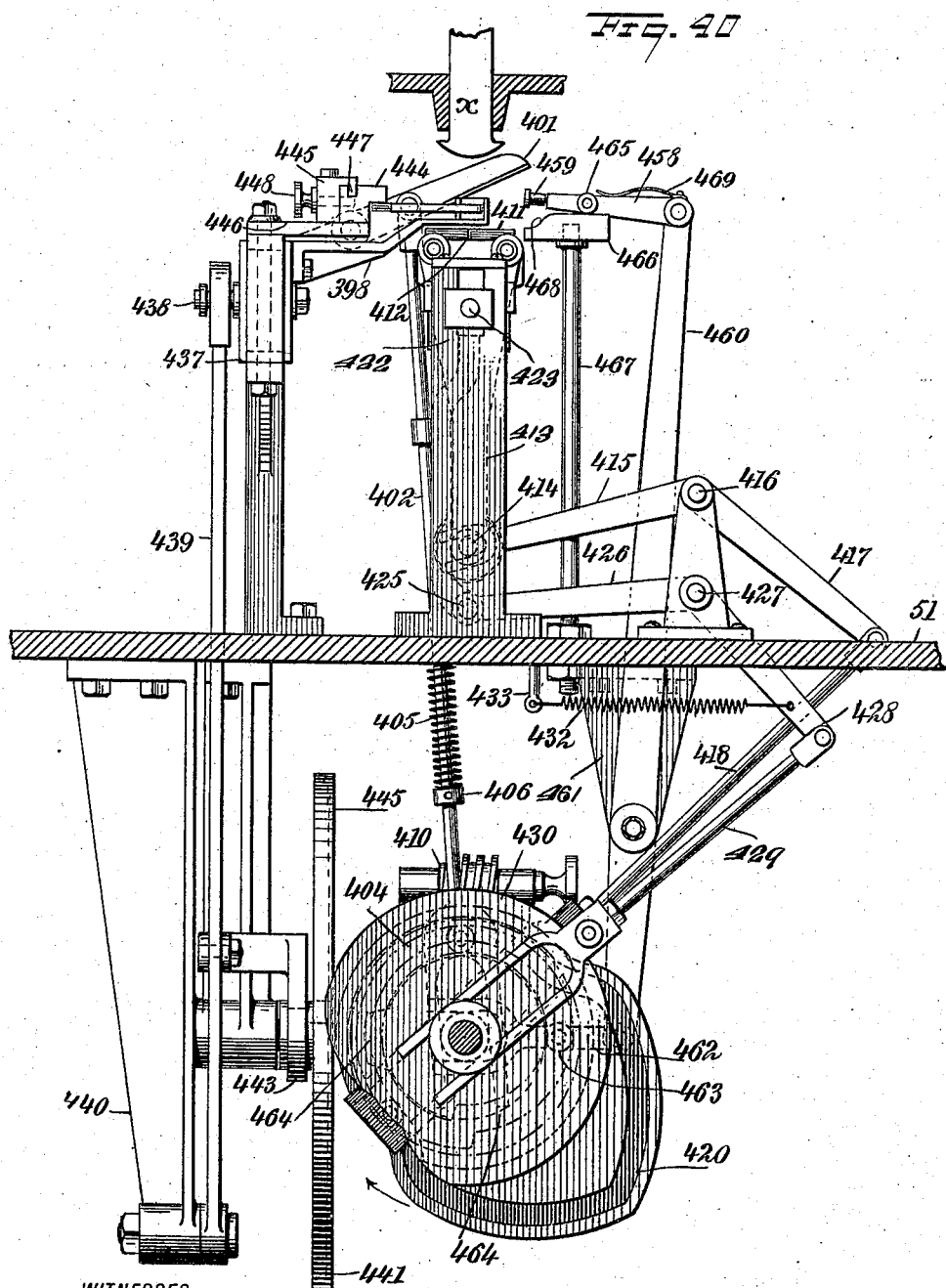

No. 847,891. PATENTED MAR. 19, 1907.
W. E. BLAUVELT.
BOOKBINDING MACHINE.
APPLICATION FILED JULY 12, 1904.
21 SHEETS—SHEET 20.
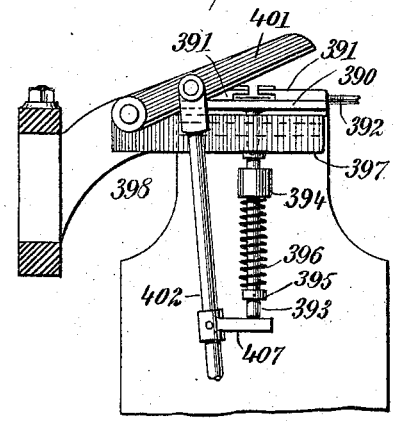
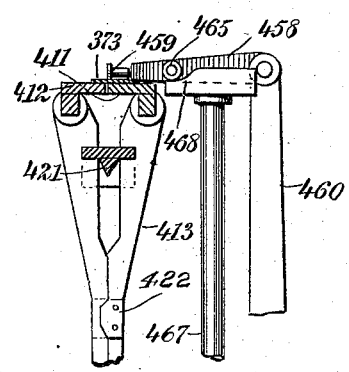
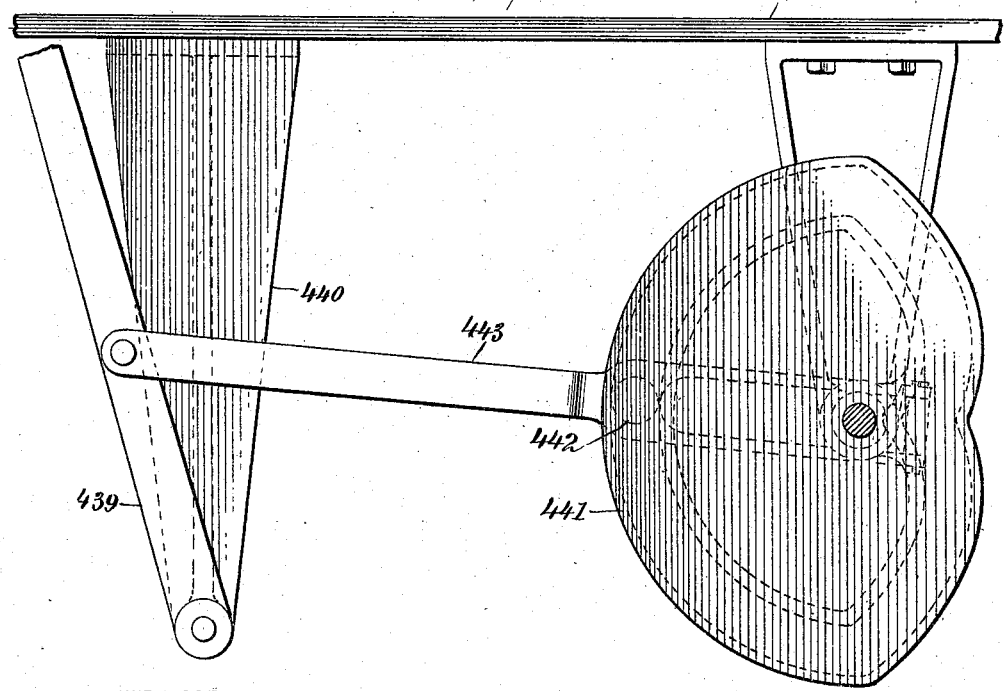
WITNESSES:
INVENTOR
William E. Blauvelt
BY
ATTORNEYS

UNITED STATES PATENT OFFICE.

WILLIAM E. BLAUVELT, OF NEW YORK, N. Y., ASSIGNOR OF ONE-HALF TO EDWARD WEST, OF BROOKLYN, NEW YORK.

BOOKBINDING-MACHINE.

No. 847,891.        Specification of Letters Patent.        Patented March 19, 1907.

Application filed July 12, 1904. Serial No. 216,204.

*To all whom it may concern:*

Be it known that I, WILLIAM E. BLAUVELT, a citizen of the United States, and a resident of the city of New York, borough of Brooklyn, in the county of Kings and State of New York, have invented a new and Improved Bookbinding-Machine, of which the following is a full, clear, and exact description.

This invention relates to improvements in machines for affixing the crash, the head-bands, and the paper lining to books preparatory to placing the covers thereon, an object being to provide a machine of this character by means of which the work may be rapidly carried on and the books delivered from the machine in a strong and neatly-finished condition.

Other objects of the invention will appear in the general description.

It may be here stated that the general plan of the machine herein described is shown in the patent granted to me under date of December 9, 1902, No. 715,540.

I will describe a bookbinding-machine embodying my invention and then point out the novel features in the appended claims.

Reference is to be had to the accompanying drawings, forming a part of this specification, in which similar characters of reference indicate corresponding parts in all the figures.

Figure 14:
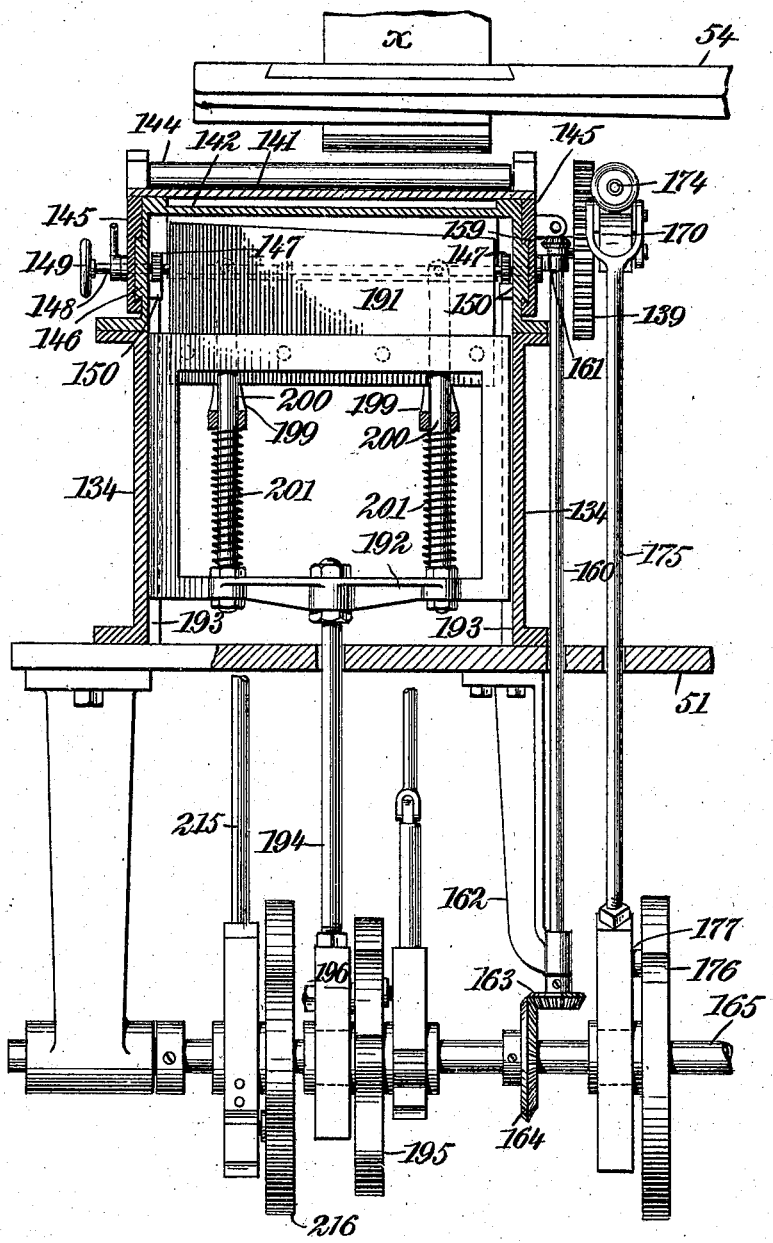
Figure 38:
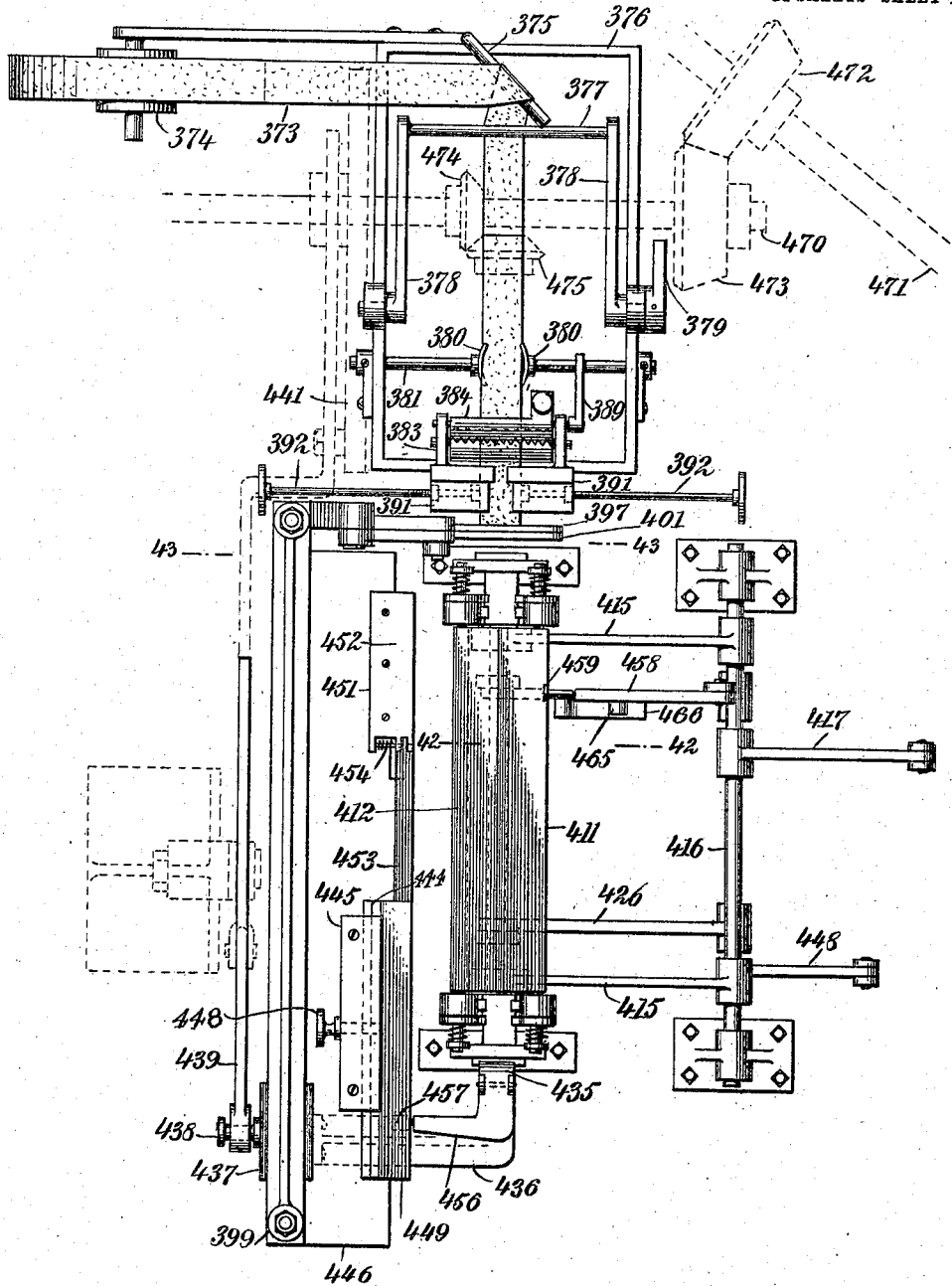
Figure 39:
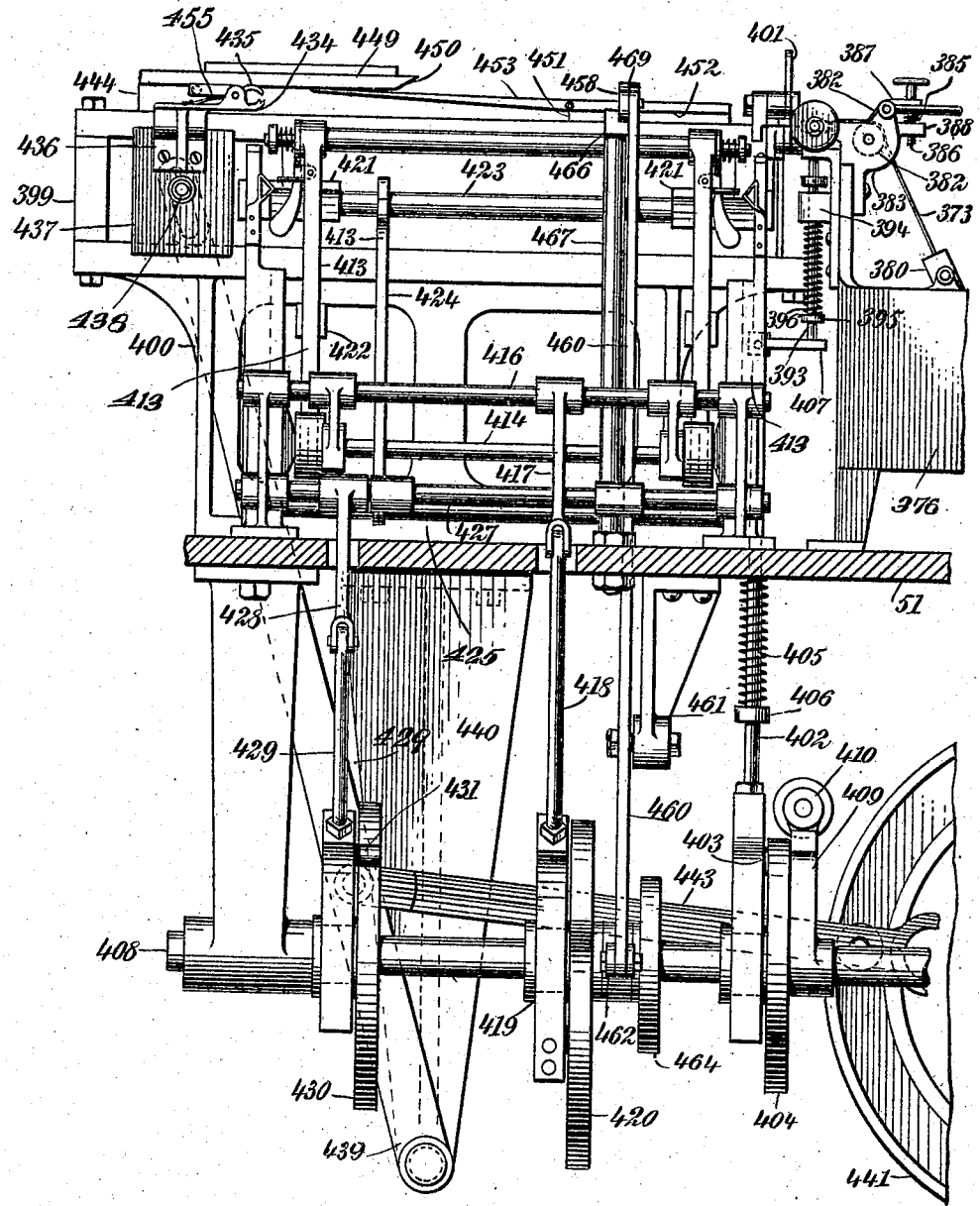
Figure 44:
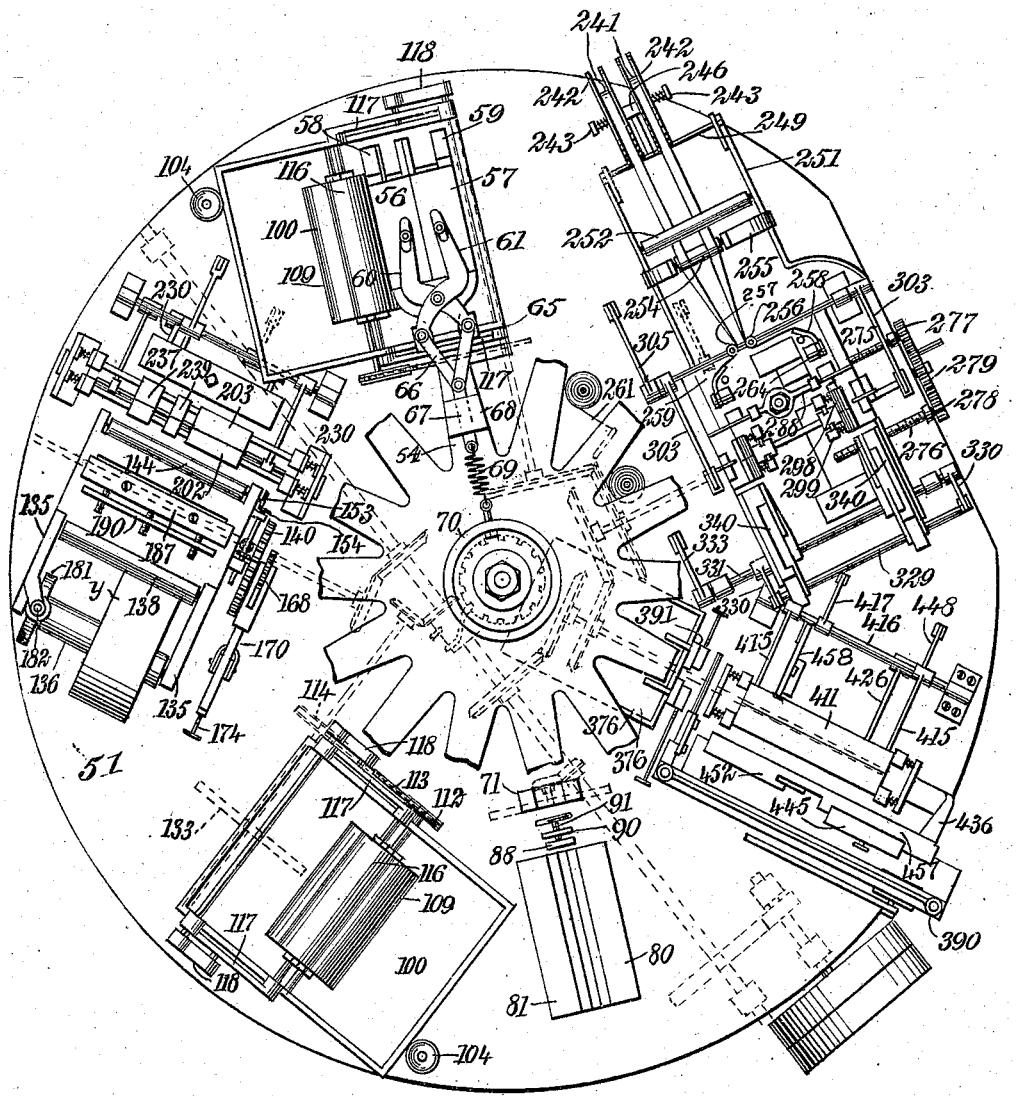

Figure 1 is a plan of one of the book-carrying arms employed. Fig. 2 is a section on the line 2 2 of Fig. 1. Fig. 3 is a section on the line 3 3 of Fig. 1. Fig. 4 is an elevation of the feeding-in mechanism. Fig. 5 is an end elevation thereof. Fig. 6 is a section on the line 6 6 of Fig. 4. Fig. 7 is an elevation showing one of the adhesive-applying mechanisms employed. Fig. 8 is a section on the line 8 8 of Fig. 7. Fig. 9 is a side elevation of Fig. 7. Fig. 10 is a plan of the crash-applying mechanism. Fig. 11 is a detail showing the feeding mechanism therefor. Fig. 12 shows the ratchet mechanism thereof. Fig. 13 is a section on the line 13 13 of Fig. 10. Fig. 14 is a section on the line 14 14 of Fig. 13. Fig. 15 is a rear elevation of the crash-applying device. Figs. 16 and 17 are respectively sections on the lines 16 16 and 17 17 of Fig. 15. Fig. 18 is an inner side elevation of said mechanism. Figs. 19, 20, 21, and 22 are elevations showing the different positions assumed by certain platens employed. Fig. 23 is a plan of the mechanism for affixing the head-bands. Fig. 24 is a section on the line 24 24 of Fig. 23. Figs. 25, 26, and 27 are detail views thereof. Fig. 28 is a section on the line 28 28 of Fig. 27. Fig. 29 is a rear elevation of the head-banding mechanism. Fig. 30 is a side elevation thereof. Fig. 31 is a section on the line 31 31 of Fig. 30. Fig. 32 is a longitudinal vertical section thereof. Fig. 33 is a section on the line 33 33 of Fig. 32. Fig. 34 shows one of the cutters employed. Fig. 35 is a sectional elevation of the means for applying adhesive to the head-bands. Fig. 36 is a plan thereof. Fig. 37 is a transverse section. Fig. 38 is a plan of the paper-lining mechanism. Fig. 39 is a side elevation thereof. Fig. 40 is an end elevation thereof. Fig. 41 shows a cam mechanism employed therewith. Fig. 42 is a section on the line 42 42 of Fig. 38. Fig. 43 is a section on the line 43 43 of Fig. 38; and Fig. 44 is a general plan view of the machine, the operating means shown therein in dotted lines being slightly different from that shown in Fig. 38.

Referring to the drawings, 50 designates a tubular central standard around which a table 51 is supported and on which is placed the several operating devices to be hereinafter described. Having bearings in the standard 50 is a shaft 52, to which is rigidly connected the book-carrier, comprising a hub 53 and a plurality of radial arms 54. As here shown, antifriction bearing-balls 55 are arranged between the lower side of the hub 53 and the top of the standard. Each arm 54 carries a pair of gripping-jaws 56 57 for engaging and holding the book while carrying the same from one portion of the machine to another. The end of the arm 54 is bifurcated, providing two members 58 59, in which the jaws 56 57 slide laterally and in parallelism. As clearly illustrated in the drawings, the members 58 59 have undercut ribs on their upper sides with which the beveled ends of the jaws engage. The jaws 56 57 are connected, respectively, to levers 60 61, the said levers being slotted at the ends to receive the lugs 62 63 on said jaws. The levers are crossed and at their crossed portions are mounted to swing on a stud 64, attached to the arm 54. From the inner projected ends of the levers 60 61 links 65 66 extend to pivotal connection with a draw-bar 67, movable in a guide 68, attached to the arm 54, and the inner end of this draw-bar 67 has a spring connection 69 with an annular flange 70, formed on the upper side of the hub 53. This spring 69 serves to move the jaws toward each other, and consequently causes the jaws to clamp the book at the sides. In all the figures where the book is shown it is indicated by x.

As a means for separating the jaws to place a book between the same and also for removing a book upon its completion I employ a spreader consisting of beveled fingers 71 72 on the upper end of a rod 73, which extends downward through a bearing-standard 74 and through the table 51. The lower end of the rod 73 is forked to engage against the opposite sides of the hub of a cam-wheel 75, having an interior cam-slot to receive a pin 76 on the forked portion of the rod. This cam 75 is mounted on a counter-shaft 77, operated from a main shaft in a manner similar to that shown in my patent above mentioned. The inwardly-projected ends of the levers 60 61 have downwardly-extended arms 78, carrying rollers 79, with which the inclined surfaces of the fingers 71 are designed to engage to move the jaws apart.

Before engaging a book between the jaws it is to be placed on a receiving-table consisting of bars 80 81, which are beveled downward and inward at their inner or adjacent sides and are adjustable toward and from each other to accommodate the different thicknesses of books on a plate 82, attached to side plates 83, mounted to slide vertically on a frame 84, attached to the table 51. The plate 82 is provided with slots through which lugs 85 86 on the bars 80 81 extend. These lugs have threaded perforations for engaging the threads of adjusting-screws 87, the said screws being provided with right and left hand threads, as clearly indicated in Fig. 6, so that by turning in one direction the bars 80 81 will be caused to move toward each other and when rotated in the reverse direction the bars will be moved from each other. The object in beveling the inner sides of the bars is so that they will practically conform to the curve of the book-back. The inward movement of the book on the receiving-table is regulated by a stop-plate 88, movable in guides 89 on a bracket 90, and the said plate is adjusted by means of a screw 91, engaging in a tapped hole in an upward extension on the bracket.

An up-and-down motion is imparted to the receiving-table by means of a cam 92, mounted on the shaft 77 and having a cam-groove to receive a pin 93 on the lower end of a rod 94, the said rod being provided with forked members for engaging against the opposite sides of the cam-hub, and this rod 94 extends through a bearing 95 and has screw-thread engagement with an interiorly-threaded sleeve 96, which has rotary connection with the under side of the plate 82, and connected to this sleeve 96 is a wheel 97, provided at intervals in its periphery with notches 98, in any one of which a swinging locking-latch 99 may engage to hold the wheel, and consequently hold the sleeve 96, from rotary motion. By this arrangement the amount of vertical movement of the receiving-table may be regulated.

*Adhesive-applying mechanism, Figs. 7 to 9.*—Before applying the crash an adhesive such as glue is to be applied to the back of the book, and I will now describe the mechanism for so applying the adhesive, it being understood that the book is carried from the receiving-table to this mechanism, which comprises a glue-tank 100, arranged in an outer jacket 101, the space between the jacket and said tank being designed to hold water as a heating medium, the heat being supplied, as here shown, from a gas-burner 102. Communicating with the water-space is an upwardly-extended pipe 103, which has a funnel-shaped top 104, through which water may be poured into the water-space. Attached to the jacket 101 are legs 105, having outwardly-extended lower ends 106, provided with perforations through which the upper ends of adjusting-screws 107 pass, the said screws being provided with collars 108 for engaging against the under sides of said projections 106, and the screws engage in tapped holes in the table 51. By this means the glue-tank may be leveled up, so that the glue will be evenly spread on the supply-roller 109, operating in the tank. The shaft of the roller 109 has a bearing at one end in a block 110, secured in the walls of the tank and casing at one side, and the other end of the shaft has a bearing in a stuffing-box 111, secured to the opposite walls, as clearly indicated in Fig. 8, and at this end the shaft is provided with a sprocket-wheel 112, from which a chain 113 extends to a connection with a sprocket-wheel 114, attached to a counter-shaft 115. Coacting with the supply-roller 109 is an applying-roller 116, which preferably has a felt covering. This roller 116 has its shaft-bearings in the horizontally-disposed members of angle-levers 117, which are mounted to swing on the upper ends of arms 118, extended upward from a rock-shaft 119. The downwardly-extended members of the angle-levers 117 have adjusting-screws 120 mounted in them and engaging against the arms 118. By these screws the bearing of the roller 116 upon the roller 109 may be regulated so that the said roller 116 will be caused to take up the proper amount of adhesive—that is, in some instances a greater amount of adhesive will be required than in other instances. The surplus glue on the roller 116 is scraped off by a blade 121, which is adjustably supported in a cross-bar 122 and held as adjusted by means of screws 123. The horizontally-disposed members of the angle-levers 117 consist each of two sections which are slidably connected together and held as adjusted by means of thumb-nuts 124, on bolts passing through slots in the two members. The object of this adjustment is to regulate the degree or movement of the roller 116 over the book-backs of different widths. The roller is held yieldingly against the book-back and is permitted to follow the transverse curve thereof by means of springs 125, attached at one end to the downwardly-disposed members of the angle-levers and at the other ends to the arms 118. It may be here stated that this adhesive-applying device is a very essential feature of the invention, and therefore the adjustments are such that the roller will travel from one joint of the book back to the other joint, and the adhesive, therefore, will not be carried over or upon the inner sides of the joints, as often happens in hand-work.

Attached to the rock-shaft 119 and extended downward therefrom is a segment-gear 126, meshing with a segment-gear 127 on the upper end of an actuating-rod 128, mounted to rock on a stud 129, attached to a hanger 130, in which the shaft 115 has a bearing. The lower end of this rod 128 carries a roller 131, which engages in a cam-channel 132, formed in a cam-wheel 133, mounted on the shaft 115. By means of this cam the roller 116 is caused to move back and forth between the supplying-roller 109 and the book-back. After applying the adhesive the book is carried to the crash-applying device, which I will now describe.

*Crash-applying mechanism, Figs. 10 to 22.*— Mounted on the table 51 are standards 134, which have bracket members 135, in which are bearings for the shaft of the crash-reel 136. From the reel the crash passes between the lower feed-roller 137 and an upper feed-roller 138, which bears by spring-pressure on the upper surface of the crash. On the shaft of the roller 137 is a pinion 139, meshing with a gear-wheel 140, to which intermittent motion is imparted, as will be hereinafter described, to cause an intermittent feeding motion of the crash. From the feed-rollers 137 138 the crash is passed between plates 141 142 to the forward feed-rollers 143 144, the upper roller 144 having vertical movement in its bearings, and these two rollers are supported in side plates 145, mounted to slide back and forth on the upper ends of the standards 134. As plainly indicated in Fig. 14, the sides of the standards 134 are provided on their outer sides with undercut ribs 146 to receive the correspondingly-shaped walls of channels formed in the inner sides of the sliding members 145. The object of mounting the said rollers in the adjustable plates is to provide for feeding crash of different widths to the platens arranged forward of the rollers, of course different widths of crash being required for different thicknesses of books.

The back-and-forth adjustments of the plates 145 are caused by pinions 147, mounted on a shaft 148, having a hand-wheel 149 on one of its projected ends, and these pinions engage with racks 150, secured to the inner sides of the standards. After adjusting the rollers the shaft may be locked by means of a jam-nut 151, engaging with a thread on the shaft, so that it may be forced against the side of one of the plates 145. For convenience in operating the jam-nut it is provided with a lever-like handle 152.

The shaft of the roller 143 has attached to it a bevel-pinion 153, meshing with a bevel-pinion 154, attached to a shaft 155, having bearing in a lug 156, carried by one of the sliding plates 145, and this shaft also is mounted to rotate and to slide longitudinally in a lug 157, mounted on the standard 134. The said shaft 155 has sliding connection with a bevel-pinion 158, the said pinion, however, being so connected to the shaft as to rotate therewith. This pinion 158 meshes with a bevel-pinion 159, attached to the upper end of a vertical shaft 160, having at its upper end a bearing in a lug 161, attached to the standards 134, and at its lower end the said shaft has a bearing in a hanger 162, depending from the table 51, and on the lower end of the shaft is a bevel-pinion 163, meshing with a bevel-gear 164 on a counter-shaft 165, driven from the main shaft of the machine. By the sliding arrangement of the shaft 155 it is obvious that forward-and-back adjustment of the forward feeding-rollers may be readily made.

I will now describe the means for imparting an intermittent feeding motion to the rear feeding-rollers.

The gear-wheel 139 has a hub or sleeve portion 166 mounted to rotate on a stud 167, attached to one of the side members or standards 134, and rigidly connected to this sleeve or hub is a ratchet-wheel 168, engaged by a pawl 169, which is held yieldingly against the ratchet-wheel by means of a suitable spring. This pawl is carried by an actuating-lever 170, which is bifurcated to form members for engaging loosely on the sleeve 166 at opposite sides of the ratchet-wheel. Movable along this actuating-lever 170 is a block 171, carrying a pointer 172 for indicating the degrees of movement along a scale 173 formed on said actuating-lever. The block 171 is movable in a slot formed in the lever, and the adjustment thereof is caused by means of a screw-rod 174, which at its inner end has rotary connection with the block, and the rod engages in a tapped hole formed in the end wall of the lever 170. From the block 171 an actuating-rod 175 extends downward and terminates in two members, which engage upon opposite sides of the hub of a cam-wheel 176, which has a cam-slot for receiving a pin 177, carried on the lower end of the rod 175.

At certain times it may be desired to stop the feeding of the crash through the rollers 137 138. Therefore I provide means for moving the roller 138 out of operative position—that is, out of engagement with the upper surface of the crash. This means consists of eccentric cams 178, mounted on the standards 134 and adapted to engage with the ends of the shaft of the said upper roller 138, these eccentrics being provided with hand-levers 179. It may be noted that the rod 175 has a screw-threaded adjustment with the forked members which engage on opposite sides of the hub on the cam 176, so as to provide for the different lengths of throw to said rod. It may be further stated that the several other actuating-rods before described and to be hereinafter described are similarly adjustable.

To prevent too free movement of the spindle supporting the crash $y$, I employ a brake mechanism which, as here shown, consists of a shoe 180, bearing upon a flange 181, attached to one end of the spindle 136. This shoe 180 is supported by a rod 182, adapted to move vertically in an arm 183, extended upward from one of the brackets 135, the shoe being held yieldingly against the flange by means of a spring 184, engaging at one end with said arm 183 and at the other end with a collar 185, having screw-thread engagement with the rod 182, and obviously by manipulating the collar 185 the tension of the spring 184 may be regulated and the bearing of the shoe on the flange 181 will also be regulated.

After passing a length of crash into the space between the plates 141 142 it is to be held stationary temporarily to sever the piece engaged between the forward feed-rollers and the body-piece of the crash. The upper plate 141 is provided with a transverse slot 186, into which a stationary knife-plate 187 extends. This knife-plate is adjustable on the upper side of the plate 141, so as to compensate for wear. As plainly indicated in Fig. 10, screws 188 pass through slots formed in the plate and engage in tapped holes in the plate 141. The fine adjustments of the plate may be made by means of screws 189, engaging in tapped holes in a rib 190 on the upper side of the plate 141, the said screws impinging against the rear edge of the plate supporting the cutting edge or knife 187. Coacting with the cutter-blade 187 is a movable blade 191, attached to the upper member of a frame 192, the said frame having ribs on its side members engaging in guide-channels 193 formed in the inner surface of the standards 134. The said blade 191 is movable through a slot formed in the lower bed-plate 142. From the lower member of the frame 192 a rod 194 extends downward through an opening in the table 51, and the members of its bifurcated end engage against opposite sides of the hub of a cam-wheel 195, and on this bifurcated portion of the rod 194 is a lug 196, which engages in a cam-channel formed in said wheel 195.

During the cutting operation the crash is held stationary against the upper plate 141 by means of presser-bars 197 198, movable through slots formed in the lower bed-plate 142 and carried by the upwardly-extended members of yokes 199, movable vertically on rods 200, carried in the frame 192, the said yokes being held yieldingly upward by means of springs 201, which surround the rods 200 and engage at the lower end with the lower member of the frame 192 and at the upper end with said yokes. These springs permit the frame 192 to continue its upward movement, causing the severing action of the blade 191 in connection with the blade 187, while the bars 197 and 198 are engaged against the crash.

From the rollers 143 144 the severed strip of crash is disposed upon platens 202 203, mounted, respectively, on shafts 204 205, the said shafts being connected to arms 206 207 in such manner as to have a rocking motion. The arms are connected to a cross-shaft 208 and are held yieldingly toward each other by means of springs 209, which have their ends seated in recesses formed in the arms. On the ends of the shaft 208 are blocks 210, which engage in channels formed in uprights 211, and vertical motion is imparted to the arms carrying the platens by means of arms 212, extended from a rock-shaft 213, and extended outwardly from this shaft 213 is an arm 214, from which a rod 215 extends downward, the said rod having a bifurcated end the members of which engage on the opposite sides of the hub of a cam-wheel 216, having a cam-channel receiving a lug 217, secured to said bifurcated end. On the ends of the shafts 204 205 are segmental racks 218, engaged by pawls 219, pivoted to the arms. These pawls have outwardly-extended lower ends designed to engage with cam-plates 220, attached to the uprights 211. Springs 221 surround the ends of the shafts and are connected thereto at one end, while the opposite ends engage with pins 222, attached to the arms, these springs being designed to return the platens to normal position after the crash shall have been applied to the back of the book.

A spreading device for the platen-carrying arms consists of a bar 223, having wedge portions 224, designed upon a downward movement to force the arms apart and upon reaching cam-plates 225, secured to the arms, to impart a quick spreading or outward movement to said arms. This bar 223 is provided at its ends with guide-blocks 226, which move in recesses 227, formed in the uprights 211. From the bar 223 arms 228 extend downward to a connection with a shaft 229, and from this shaft an arm 230 extends to a rock-shaft 231, having a downwardly-extended arm 232, from which a spring 233 extends to a connection with a pin 234, depending from the table 51. Connected to the lower end of the arm 232 is a rod 235, having a bifurcated end engaging the opposite sides of the hub of the cam-wheel 195, and on this bifurcated portion is a lug 236, which engages with the periphery of said cam-wheel.

Forward of the platens is a stop-plate 237, against which the edge of the crash is designed to engage. This stop-plate is adjustably mounted on a standard 238.

In the operation, it being understood that adhesive has been applied to the book-back by the mechanism heretofore applied, the severed strip of crash is carried upward from the position indicated in Fig. 19 to the position indicated in Fig. 20, and then by a further upward movement the shafts carrying the platens are rocked, while the arms carrying the same are spread apart, as indicated in Fig. 21, causing a smoothing action over the crash when applied to the book-back. The ratchets 218 engaged by the pawls 219 will hold the platens in their tilted position, as indicated in Fig. 21, until the arms move downward and the pawls 219 engage with the cam-plates 220. This will force the pawls out of engagement with the ratchets, permitting the springs 221 to move the platens to normal position. Before this takes place, however, the bar 223 will be moved downward, causing the wedges 224 to engage with the cam-plates 225, causing a quick opening movement of the arms to sever the platens from the crash. For long books it is necessary to increase the length of the platens, and therefore I provide auxiliary platens 239, adapted to be mounted on the shafts 204 205. As here shown, the auxiliary platens are attached to spring-plates 240, designed to engage on opposite sides of said shafts.

*Head-banding mechanism, Figs. 25 to 35.*—
From the crash-applying device the book is carried to the mechanism for affixing the head-bandings, which consists of strips of fabric 241, fed from reels 242, mounted on a shaft 243 and arranged between collars 244, and at the outer sides of the reels are tension-springs 245, which will prevent any backward movement of the reels. The said shaft, it will be noted in Fig. 36, is secured in an arm 246, extended from a paste-receptacle 247. From the reels the head-banding strips pass over a roller 248, arranged to rotate on a shaft 249, mounted in vertically-disposed arms 250, arranged to slide in guide-strips 251, secured to the inner sides of the opposite side walls of the paste-holder 247, and supported in the lower ends of the arms 250 is a roller 252, under which the head-banding strips pass, the said roller being submerged in the paste while the machine is in operation. When placing the head-bands around said roller, the arms 250 may be raised up to the position indicated in dotted lines in Fig. 38 and held in such positon by means of a shoulder 253, adapted to engage the upper end of the guides 251. From the roller 252 the head-bands pass over a roller 254, supported in standards 255, attached to the sides of the paste-holder.

From the roller 254 one of the head-bandings is carried to vertical idlers 256 257, where the said bandings are turned edgewise in vertical direction, and from these idlers 256 257 the bandings are carried to folding and cording devices 258 259, which consist of fixed plates horizontally curved and pointed at their forward ends, as clearly indicated in Fig. 29. Each folding device 258 259 is provided with a perforation 260, through which cords 261 262 pass, and from these perforations 260 the plates are slotted forward and open outward at the forward end. As shown, the cord 261 passes directly from its spool through the opening of the folder 258, while the cord 262 passes first to the guide-pulley 262$^a$ and then back through the opening of the folder 259. In passing over the formers the cord is placed at the center or fold of the head-bandings, and from the formers the head-bandings pass to pressing-rollers 263 264, the upper roller 264 being mounted in yielding bearings. Each upper roller 264 is provided with an annular channel 265, adapted to receive the corded edge. It will be noted that the pressing-rollers are mounted in brackets 266, adjustably mounted on a standard 267, attached to a table 268. By this means the said rollers may be moved toward or from the folding devices. These pressing-rollers also serve to move the head-bandings forward through guides 269, which are in the form of flat tubes, supported on rods 270, movable through openings in the brackets 266, and these guides are moved downward, as will be hereinafter explained, by means of springs 271, which surround said rods and engage at the lower ends with collars on the rods and at the upper ends against the brackets. It may be here stated that in this part of the invention all of the actuating devices forward of and including the folder—that is, those actuating devices at the outer side—are mounted for outward and inward adjustments, so as to adapt the mechanism for different lengths of books. As here shown, the table 268 at the outer side of the machine is mounted on a standard 272, having a base portion 273, mounted to slide in guides 274 on the table 51. These adjustments are made by screw-rods 275 276, engaging in tapped holes in the standard and having on their outer ends pinions 277 278, which engage with an adjusting gear-wheel 279, having a crank-handle 280. The rollers 263 264 receive the head-bandings and press the same, after which the bandings pass to the cutting device, consisting each of a fixed blade 281, which, however, is adjustable as to its shearing angle and in vertical position on the standard 267. As here shown, the cutting-blades 281 are provided with slots 282, arranged at an upward and rearward incline, and through these slots clamping bolts or screws 283 pass into the standard. Operating in threaded lugs 284 on the standard are adjusting-screws 285, which engage against the lower side of the blades and serve as a means for holding the blades as adjusted. Coacting with each fixed blade 281 is a swinging blade 286, and pivotally connected to the blade 286 are rods 287, which pass downward to a connection with a cross-head 288, which is of sufficient length at the outer end to permit the adjustments of the devices, as before mentioned. Each rod 287 carries a tappet-finger 289 for engaging at a certain time with the rods 270 to force the guides upward, so that said guides will cause the head-bandings to follow the movements of the cutting devices, thus bringing the head-bandings in proper position for engagement by the grippers to act thereon.

From the cross-head 288 a rod 290 extends downward through a guide 291 on the table 51 and is attached to a lower forked portion 292, the forked end of which engages over the hub of a cam-wheel 293, provided with a cam-slot 294, in which a roller 295, carried by the part 292, engages. The cam-slot 294 is provided at one side of the cam-wheel with an inwardly-projecting shoulder 296, which will permit of a quick inward movement of the roller 295, and consequently a quick movement of the cutting-blades under the influence of a spring 297, which engages at its upper end against the under side of the table 51 and at its lower end with the right-angle upper portion of the part 292.

Before the cutting of the head-bandings the parts to be applied to the book are drawn toward the platens 298 299, mounted, respectively, in arms 300 301, which are operated in the same manner as the platens and arms for the crash-applying mechanism—that is, these arms are mounted on a shaft 302, engaged by the forked members of arms 303, which extend rearward and connect with a rock-shaft 304, from the end of which an arm 305 projects and pivotally connects with an actuating-rod 306, the said actuating-rod having a forked member to engage over the hub of the peripheral cam-wheel 307, mounted on a shaft 308, said forked member having a roller 309 for engaging against the cam. By means of this cam the arms carrying the platens are moved upward, and as they move upward against the back of the book they are spread out with a wiping motion, as heretofore explained in connection with the crash-platens. They are moved quickly apart or away from the head-bandings by means of a wedge-bar 310, adapted to engage with cam-plates 311, carried by the arms, and this wedge-bar is connected, by means of angular arms 312, with a rock-shaft 313, from which arms 314 extend to a connection with a rock-shaft 315, from which another arm 316 projects and connects with an actuating-rod 317, extending downward and having a forked member to engage over the hub of an actuating-cam 318 on the shaft 308. This cam 318 is a peripheral cam and is engaged by a roller 319, carried by the rod 317.

When the platens are separated and disengaged from the head-bandings, they are held apart by means of pawls 320 engaging with ratchet-segments on the arms, as before described, and on the downward movement the ends of these pawls 320 will engage with tappets 321, releasing the pawls from the ratchets and permitting the springs 322 to move the platens to normal or horizontal position.

I will now describe the means for drawing the head-bandings onto the platens. This means comprises grippers each consisting of a fixed jaw 323 and a jaw 324, pivoted to lugs 325 on the fixed jaw and pressed normally toward the fixed jaw by means of a spring 326. Each gripping device is mounted on a carriage 327, arranged to slide in guides 328. The opposite carriages are connected to a shaft 329, from which arms 330 extend downward and connect with a rock-shaft 331, on the outer end of which is an arm 332, having connection with an actuating-rod 333, operated by a grooved cam 334 on the shaft 308.

Mounted on the upper member of each guide 328 is a standard 335, having at the top a horizontal portion 336, on the forward end of which is arranged a block 337, designed to be engaged at its upper and lower sides and at its end, as will be hereinafter described, by a roller 338, carried by the arm of the movable jaw. Also mounted to swing on said horizontally-disposed portion is a switch-finger 339, which extends substantially to a point at its forward end. Adjustably mounted on the horizontal portion 336 is an inclined block 340, designed to move the jaw 324 to open position to release the head-bandings. This block 340 is beveled on its under side, and it may be adjusted lengthwise of the portion 336 by means of an adjusting-screw 341, engaging in a tapped hole in said block and passing loosely through a part of said horizontal portion 336, and it may be held rigidly as adjusted by means of a bolt 342, which passes through the block and also through a plate 343, the bolt being provided with a cam-lever 344 for clamping the bolt.

In the operation as the gripping devices are moved toward the platens and across the same the rollers 338 will engage against the under sides of the switches 339 and against the under sides of the blocks 337 until they reach the end thereof, when by means of the springs 326 the jaw will be caused to quickly close to engage the ends of the head-bandings extended forward of the guide devices. Now the opposite movement will take place, and during this movement the rollers 338 will pass along the top of the parts 337, 339, moving 339 downward, and come into engagement with the incline of the blocks 340, which will open the movable jaws, thus releasing the head-bandings when drawn upon the platens. For the next movement the rollers 338 will pass over the ends of the switches 339 ready to pass along the under sides thereof, as before mentioned.

When the head-bandings are on the platens and after the cutting operation, it is necessary to tightly hold the head-bandings to prevent any slipping or displacement during the releasing of the grippers. As clearly shown in Fig. 27, each holding device consists of an arm 345, mounted to swing on a standard 346, and the outer side of its engaging end when gripping the head-banding will be spaced slightly from the outwardly and upwardly extended flanges on the platens to permit the folded edge to pass therethrough—that is, by this arrangement the engaging portions of the arms will contact with the body of the bandings inward of the cords. From an outwardly-extended finger 347, which is inclined at an angle with relation to the clamping-arm to which it is connected, a rod 348 extends downward and is connected to a slide-plate 349, movable vertically in a guide 350, attached to the upright 272. This construction is arranged at both sides, as clearly indicated in Fig. 29.

Attached to each carriage 327 is a forwardly-extended plate 351, having a longitudinal channel, the lower edge wall 352 being horizontal, the upper wall, however, having inclines 353 354, which are divergent downward and are connected at the upper end by a horizontal portion 355, and the incline 354 terminates in an upper horizontal wall 356. Secured to the inner side of the plate 351 is a plate 357, to which a switching mechanism is attached. This switching mechanism consists of a fixed guide-block 358, to the opposite ends of which switch-tongues 359 360 connect. The normal position of these switch-tongues is indicated in Fig. 26—that is, the tongue 359 is normally held with its end against the bottom wall of the channel, while the tongue 360 is held normally in engagement with the upper wall, and they are so held by means of a compression-spring 361, which forces the tongues in opposite directions. The slide-plate 349 carries a roller 362, which is designed to engage with said switching mechanism during the back-and-forth movements of the plates 351.

During the movements of the carriages to draw the head-bandings onto the platens and immediately upon the bandings being drawn laterally on said platens the roller 362 will engage against the upper side of the switch-tongues 359, causing an upward movement of the slide-plate, and consequently moving the clamping-arms into engagement with the head-bandings, and as the fixed block 358 moves along underneath the roller the arm will be kept in such holding position until the required head-banding has been released from the grippers. Then as the carriages continue their movement to normal position the rollers 362 will engage with the upper sides of the tongues 360, swinging them downward until the ends are passed, and then the slide-plate will be moved downward, releasing the head-bandings, after which the platens are moved upward to press the bandings onto the book-back. When the grippers are moved along for gripping the next head-bandings, the roller 362 will pass along the under side of the tongues 360, swinging the tongues 359 upward, and pass the straight portions of the channels ready for the next operation, as above described.

It may be here stated that I do not confine my invention to the forming of the head-bandings as described, as by omitting the former the usual so-called "silk" bandings may be applied.

I provide means for regulating the period at which the movable cutting-blades 286 should be operated—that is, to adjust the relation of the shoulder 296 to the movement. For this purpose the cam 293 is rotatively movable on the shaft 308. It is held as adjusted, however, by means of an arm 363, rigidly attached to the shaft, and a worm-shaft 364, engaging with a segmental rack 365 on the gear-wheel 293. After adjustment the parts are locked together by means of a set-screw 366, which passes through arc-slots 367 into the arm 363. The shaft 308 at its outer end is supported in a hanger 368.

The arms 345 are mounted loosely on studs 369 and are held so as to yield slightly when brought to bear upon the head-bandings by means of springs 370, which are extended around the studs within the bearings and connected at one end to the arms and at the other end to the heads of the studs.

It will be noted that instead of connecting the gripping devices directly to the carriages 327 the fixed jaws are attached to uprights 371, which at their lower portions are slotted to receive fastening-screws which pass into the carriages, as clearly indicated in Fig. 32. It will further be noted that the switches 339 are held yieldingly downward by means of springs 372.

*Paper-lining mechanism, Figs. 36 to 43.*— From the head-banding device the books are next carried to the device for applying the paper lining. The paper lining 373 passes from a reel 374 over an angularly-disposed finger 375, which turns the paper flatwise to pass through a paste-receptacle 376. From the finger 375 the paper passes underneath the device for holding the same in the paste. This device consists of a bar 377, attached to arms 378, having swinging connection with the paste-holder 376. On the shaft of one of the arms is a hand-lever 379, by means of which the bar 377 may be moved upward and out of the paste when it is desired to pass a new strip of paper underneath the same. The paper is centered between guides 380, adjustable on a rod 381, arranged in the holder 376. From the guides 380 the paper passes over a roller 382, supported in a bracket 383, and arranged over this roller is a device for scraping off from the paper the surplus adhesive, leaving a thin and even coating. This scraper consists of a plate 384, mounted to swing in the bracket 383 and having a serrated edge for engaging with the paper, as clearly indicated in Fig. 38. The scraper is held yieldingly against the paper by means of a spring 385, arranged around an adjusting-screw 386, between a finger 387, extending from the upper edge of said plate, and a lug 388, in which the screw engages. On an extended shaft of the scraper is a handle 389, by means of which the scraper may be swung upward against resistance of the spring when it is desired to pass paper underneath the same. After passing from this scraper-plate the paper passes through a guide consisting of a plate 390 and blocks 391, mounted to slide on the plate 390. These blocks are undercut at their adjacent ends, as clearly shown in Fig. 43, and they are adjusted toward and from each other to different widths of paper by means of adjusting-screws 392, which extend outward to the sides of the machine and are supported in suitable bearings.

Extended downward from the plate 390 is a rod 393, the said rod passing through a lug 394, attached to a standard which supports the bracket 383, and arranged between this lug and a collar 395 on the rod is a spring 396, which serves to move the said rod, and consequently the guide, downward to follow the movements of the cutting-shear to be shortly described and the purpose of which is the same as that described in connnection with the head-banding cutter. Arranged forward of this guide is a cutter consisting of a fixed blade 397, extended from a bracket 398, attached to a guide 399, supported on a standard by a frame 400, and coacting with the blade 397 is a swinging shear-blade 401, from which a rod 402 extends downward and has a roller 403 engaging in a channel formed in a cam-wheel 404, and a quick movement is imparted to the rod 402 to quickly sever the paper when the roller 403 comes into line with a cam-shoulder similar to that shown at 296 in Fig. 30 by means of a spring 405, surrounding the rod 402 and engaging at one end with the table 51 and at the other end with a collar 406 on the rod. The rod 402 carries a tappet-finger 407 for engaging with the end of the rod 393 to force the guide upward during the upward movement of the blade 401, so as to keep the paper in correct horizontal alinement between the blades, and of course the guide will be moved downward as the cutting-blade 401 swings downward, as before mentioned. The cam 404 is loosely mounted on a shaft 408, so that the cam-shoulder may be adjusted to cause the operation of the blade at the proper time. The cam-wheel, however, is held adjusted in the same manner as the wheel 293—that is, an arm 409 is rigidly attached to the shaft and carries a worm-shaft 410, which engages with a rack on the cam-wheel, and when adjusted the parts are held together by a clamping-screw.

Arranged forward of the guiding device are platens 411 412, which have their shaft-bearings in arms 413, carried by a shaft 414, from which an arm 415 extends to a rock-shaft 416, from which an arm 417 extends to a connection with an operating-rod 418, having a forked member for engaging on the opposite sides of a hub 419 of a cam-wheel 420, with which a part on the forked member of the rod 418 engages. The action of these platens is practically the same as the several other platens before described—that is, the platens are held after performing their rubbing operation in their open position by means of a pawl-and-ratchet mechanism, and they are separated by wedges 421, engaging with cam-plates 422, and the shaft 423, on which the wedges are mounted, is connected by arms 424 with a shaft 425, from which an arm 426 extends to a rock-shaft 427, having an arm 428, extended rearward and pivotally connected to an actuating-rod 429, having a forked member for engaging the opposite side of the hub on the peripheral cam-wheel 430, attached to the shaft 408. The lug or roller 431, mounted on the rod and engaging with the periphery of the cam, is held yieldingly against the surface of the cam by means of a spring 432, which is connected at one end to the arm 428 and at the other end to a pin 433, depending from the table 51.

I will now describe the gripper mechanism for moving the paper over the platens. This mechanism consists of a fixed jaw 434 and movable or swinging jaw 435, the said jaw 435 being mounted to swing on lugs extended upward from the jaw 434. The said jaw 434 is attached to an arm 436, which extends from a carriage 437, movable in the guide 399. On the outer side of this carriage 437 is a wrist-pin 438, which passes into a slot formed in a swinging lever 439, being mounted to swing on the lower end of a hanger 440, attached to the table 51. Back-and-forth movement is imparted to the carriage through the medium of a cam 441, which engages a roller 442 on the pitman or actuating rod 443, which connects with the lever 439. As a means for controlling the movable jaw 435 of the gripping device both in its closing on a strip of paper and upon releasing the same I employ a mechanism consisting of a block 444, adjustable along a guide 445, attached to a plate 446, secured to the upper member of the guide 399. This guide 445 has a downwardly-extended flange 447, which engages in a channel formed in the block 444, and the block is held as adjusted lengthwise by means of a set-screw 448. The block 444 has an inwardly-extended flange 449, the inner end of which is inclined, as at 450. Rigidly connected to the plate 446 at the end near the cutting device is another block 451, having an inwardly-extending flange 452, and mounted to swing on the inner end of this block 451 and having its under side on a plane with the under side of the flange 452 is a switch-tongue 453, which at its free end bears against the under side of the flange 449 and is held yieldingly against the same by means of a spring 454, attached at one end to the pintle of the tongue and at the other end to the block 451, as shown in Fig. 39. The movable jaw 435 is moved to its closing position by means of a spring 455, Fig. 39, and extended laterally from the lever portion of this jaw is an arm 456, Fig. 38, provided with a roller 457, which is designed to engage underneath the parts 449 452 453. In the operation of this part of my invention the carriage carrying the gripping mechanism is moved over and the movable jaw will remain in its open position by passing along the under side of said parts above mentioned. Upon reaching the under side of said flange 452, however, the jaw will be moved to its closed position, gripping the end of the paper adjacent to the cutting device, and then the jaw will be moved outward to carry the paper to the platens. At this time the roller will pass over the top of the flange 452, over the top of the tongue 453, and upon engaging with the inclined surface 450 will cause the jaw to open, releasing the paper, and the paper will be released obviously at any point at which the incline 450 may be located across the machine, and thus the device is adapted for placing the linings in books of different lengths. Of course after leaving the tongue 453 the jaws will remain open for the next action.

Before reaching its proper place on the platens the piece designed to be placed on the back of a book is severed from the main strip by a quick action of the cutting-blade 401. Then the severed strip continues to the proper position, and when released by the jaws it must be temporarily held by means similar to that for holding the head-bandings. The device for this purpose, as here shown, consists of an arm 458, having a head 459 for engaging upon the paper. The outer end of the arm 458 is pivotally connected to a lever 460, which extends downward through an opening in the table 51 and is mounted to swing on a hanger 461. The downwardly-extended portion of this lever 460 is pivotally connected to a short arm 462, which has a roller 463, engaging in a groove in a cam-wheel 464. On one side of the arm 458 is a roller 465, which engages on the upper side of a block 466, supported on a standard 467, and at its inner end this block 466 is curved downward, as indicated at 468. The arm is held yieldingly by means of a spring 469, attached at one end to the upper end of the lever 460 and bearing upon the upper side of said arm. As the lever moves forward the arm of course will be moved forward, and when the roller reaches the incline 468 it will pass onto the same until the head 459 engages with the paper, where it is momentarily held.

The cam 441 is mounted on a counter-shaft 470, which is driven from a main shaft 471 through the medium of bevel-gears 472, 473, and a bevel-pinion 474 on said counter-shaft meshes with a corresponding pinion 475 on the shaft 408.

After applying the paper lining the finished book is carried to the receiving-table and removed.

Having thus described my invention, I claim as new and desire to secure by Letters Patent—

1. In a machine of the character described, platen-carrying arms, means for moving the same, shafts having rocking motion in said arms, platen-sections fixed to said shafts, auxiliary platens, and spring-plates on said auxiliary platens for engaging on opposite sides of said shafts.

2. In a machine of the character described, vertically-movable platen-carrying arms, rock-shafts supported by said arms, platens on said shafts, racks on the ends of said shafts, pawls carried by the arms for engaging with said racks, the said pawls having outwardly-extended lower ends, fixed cam-plates for engaging with said ends to release the pawls from the racks, and springs for moving the platen-shafts to normal position.

3. In a machine of the character described, a head-banding mechanism comprising means for applying adhesive to the head-bandings, vertically-disposed idler-rollers for giving the bands a quarter-twist, and folding devices consisting of longitudinally-curved plates extended substantially to a point at the forward ends.

4. In a machine of the character described, a head-banding mechanism comprising means for applying an adhesive to the head-bandings, idler-rollers for giving the bands a quarter-twist, and folding devices consisting of longitudinally-curved plates extended substantially to a point at the forward end, each plate being provided with a perforation for the passage of a cord.

5. In a machine of the character described, a head-banding mechanism comprising pressing-rollers, a fixed cutting-blade forward of the pressing-rollers, a swinging cutting-blade, and a guide arranged between said blades and the pressing-rollers and having a movement with the moving-blade.

6. In a machine of the character described, a head-banding mechanism comprising pressing-rollers, a fixed cutting-blade forward of the pressing-rollers, a swinging cutting-blade, a cam-actuated rod for swinging said blade, a guide arranged between the cutting device and the pressing-rollers, a rod extended downward from said guide, means carried by the blade-actuated rod for moving said guide and rod upward, and means for moving said guide and rod downward.

7. In a machine for the purpose specified, a head-banding mechanism comprising platens, swinging holding-arms, rods extended downward from said arms, longitudinally-movable plates, guides on said plates, slide-bars arranged in said guides and having connection with said rods, each of said sliding plates being slotted, the lower wall of the slot being straight, the upper wall of said slot having reversely-inclined portions connected by a horizontal portion, a block having its upper surface parallel with said last-named horizontal portion, a switch-tongue arranged on one end of said block and held yieldingly at a downward incline, a switch-tongue mounted on the other end of said block and held yieldingly in an upward position, and a roller carried by the slide-bars for engaging with said block and with the switch-tongues.

8. In a machine of the character described, a paste-applying device, adjustable guide for receiving material from the paste-applying device, means for feeding the material, a cutting mechanism comprising a fixed blade and a movable blade, means for causing the movements of said movable blade, means actuated by the movements of said blade for elevating said guide, and a spring for moving the guide downward.

9. In a machine of the character described, a paper-lining-applying mechanism comprising a cutter, platens forward of the cutter, a carriage movable lengthwise of the platens, a gripper-jaw rigidly connected to said carriage, a jaw mounted to swing on the first-named jaw, a flanged part adjustable lengthwise of the platens, a flanged part adjacent to the cutter, and a switch-tongue having swinging connection with said last-named flanged part.

10. In a machine of the character described, a paper-lining-applying mechanism comprising platens, a cutting device, a guide arranged lengthwise of the platens, a block adjustable along said guide, means for holding the block as adjusted, an inwardly-extended flange on said block, the inner end of said flange being inclined, a flanged block adjacent to the cutter, a switch-tongue mounted to swing on the inner end of said last-named block, a spring for holding said tongue yieldingly in normal position, a carriage movable lengthwise of the platens, a gripper consisting of a jaw rigidly connected to said carriage, a jaw mounted to swing on the first-named jaw, and a roller carried by said swinging jaw for engaging underneath the first-named flange and along the upper and lower sides of the last-named flange and of said tongue.

11. In a machine of the character described, a cutting device, means for operating the cutting device, platens arranged in line with said cutting device, a swinging lever, an arm extended from the lower end of said lever, a cam with which said arm engages, an arm pivoted to the upper end of the lever, a block having its inner end curved downward, a roller on said upper arm for engaging on said block, and a spring for holding the arm yieldingly in connection with the block.

12. In a machine of the character described, in combination with platens a cutting mechanism comprising a fixed blade, a swinging blade, a rod extended downward from the swinging blade, a cam for actuating said rod, a guide adjacent to the blades, a rod extended downward from said guide, a part carried by the first-named rod for moving the last-named rod upward, and a spring for moving said last-named rod downward.

In testimony whereof I have signed my name to this specification in the presence of two subscribing witnesses.

WILLIAM E. BLAUVELT.

Witnesses:
JNO. M. RITTER,
C. R. FERGUSON.